US 8,655,499 B2

(12) United States Patent
Sackman et al.

(10) Patent No.: US 8,655,499 B2
(45) Date of Patent: *Feb. 18, 2014

(54) CONTROLLING VIRTUAL POWER CIRCUITS

(75) Inventors: Ronald Ward Sackman, Mountain View, CA (US); John Leo Meier, St. Charles, MO (US)

(73) Assignee: The Boeing Company, Chicago, IL (US)

(*) Notice: Subject to any disclaimer, the term of this patent is extended or adjusted under 35 U.S.C. 154(b) by 815 days.

This patent is subject to a terminal disclaimer.

(21) Appl. No.: 12/709,407

(22) Filed: Feb. 19, 2010

(65) Prior Publication Data

US 2011/0208367 A1 Aug. 25, 2011

(51) Int. Cl.
- *G05D 3/12* (2006.01)
- *G05D 5/00* (2006.01)
- *H02H 3/00* (2006.01)
- *H02H 7/00* (2006.01)

(52) U.S. Cl.
USPC ............... 700/295; 361/64; 361/66; 700/296; 700/297

(58) Field of Classification Search
None
See application file for complete search history.

(56) References Cited

U.S. PATENT DOCUMENTS

| 5,341,088 | A | * | 8/1994 | Davis | 324/106 |
| 5,696,903 | A | | 12/1997 | Mahany | |
| 6,018,449 | A | * | 1/2000 | Nelson et al. | 361/66 |
| 6,111,735 | A | * | 8/2000 | Nelson et al. | 361/64 |
| 6,191,500 | B1 | * | 2/2001 | Toy | 307/64 |
| 6,243,244 | B1 | * | 6/2001 | Nelson et al. | 361/64 |
| 6,347,027 | B1 | * | 2/2002 | Nelson et al. | 361/64 |
| 7,173,935 | B2 | | 2/2007 | Lou et al. | |
| 7,231,280 | B2 | | 6/2007 | Costa | |
| 7,664,117 | B2 | | 2/2010 | Lou et al. | |
| 8,077,049 | B2 | | 12/2011 | Yaney et al. | |

(Continued)

FOREIGN PATENT DOCUMENTS

| WO | 03056680 A2 | 7/2003 |
| WO | 2008006116 A2 | 1/2008 |
| WO | 2011102926 A2 | 8/2011 |
| WO | 2011102927 A2 | 8/2011 |

OTHER PUBLICATIONS

Choudhury, "Intelligent energy management in Smart Grids-Fraunhofer ISE", Nov. 19, 2009, Global Solar Technology. http:globalsolartechnology.com.

(Continued)

*Primary Examiner* — Kavita Padmanabhan
*Assistant Examiner* — Sunray R Chang
(74) *Attorney, Agent, or Firm* — Yee & Associates, P.C.

(57) ABSTRACT

A method and apparatus for controlling circuits in an electrical power grid. Parameters in the circuits are monitored. Each circuit comprises nodes in the electrical power grid and a number of lines connected to the nodes in the electrical power grid. The number of lines is configured to carry electrical power. The nodes control the electrical power in the number of lines. A number of agent processes associated with the nodes communicate with each other using a communications network, configure the nodes in the electrical power grid into a number of circuits, and control a delivery of the electrical power through the number of circuits to loads. A determination is made as to whether to make a change to the number of circuits based on the number of parameters and a policy. The circuits are changed using the policy in response to a determination to make the change.

28 Claims, 16 Drawing Sheets

(56) References Cited

U.S. PATENT DOCUMENTS

| | | | |
|---|---|---|---|
| 8,183,995 B2 | 5/2012 | Wang et al. | |
| 8,315,743 B2* | 11/2012 | Sackman et al. | 700/286 |
| 2003/0227373 A1 | 12/2003 | Lou et al. | |
| 2004/0100684 A1 | 5/2004 | Jones et al. | |
| 2006/0125421 A1 | 6/2006 | Costa | |
| 2007/0005193 A1* | 1/2007 | Nelson et al. | 700/286 |
| 2007/0201494 A1 | 8/2007 | Lou et al. | |
| 2008/0039066 A1 | 2/2008 | Laroia et al. | |
| 2008/0125912 A1 | 5/2008 | Heilman et al. | |
| 2008/0258836 A1* | 10/2008 | Kim et al. | 333/17.3 |
| 2008/0272934 A1 | 11/2008 | Wang et al. | |
| 2009/0132070 A1 | 5/2009 | Ebrom et al. | |
| 2009/0187285 A1 | 7/2009 | Yaney et al. | |
| 2009/0265042 A1 | 10/2009 | Mollenkopf et al. | |
| 2010/0019575 A1 | 1/2010 | Verges | |
| 2010/0179862 A1 | 7/2010 | Chassin et al. | |
| 2010/0278187 A1 | 11/2010 | Hart et al. | |
| 2011/0103393 A1 | 5/2011 | Meier et al. | |
| 2011/0204719 A1 | 8/2011 | Sackman et al. | |
| 2012/0022713 A1 | 1/2012 | Deaver, Sr. et al. | |

OTHER PUBLICATIONS

"Remote Intelligent Gateway (RIG) Technical Specification", pp. 1-18, California ISO, retrieved Feb. 18, 2010 http://www.caiso.com/docs/2001/10/15/200110151527535933.pdf.

"Grid Asset Management", Siemens, 1 page, 2009 http://www.energy.siemens.com/hq/en/energy-topics/smart-grid/efficient-network.htm.

PCT Search Report dated Aug. 5, 2011, regarding International Application No. PCT/US2011/021466 dated Jan. 17, 2011, issued by International Search Authority.

PCT Search Report dated Aug. 5, 2011, regarding International Application No. PCT/US2011/021459 dated Jan. 17, 2011, issued by International Search Authority.

USPTO Office Action dated Mar. 20, 2012 regarding U.S. Appl. No. 12/709,400, 20 pages.

USPTO Notice of Allowance dated Jul. 16, 2012 regarding U.S. Appl. No. 12/709,400, 7 pages.

U.S. Appl. No. 12/709,400, filed Feb. 19, 2010, Sackman et al.

* cited by examiner

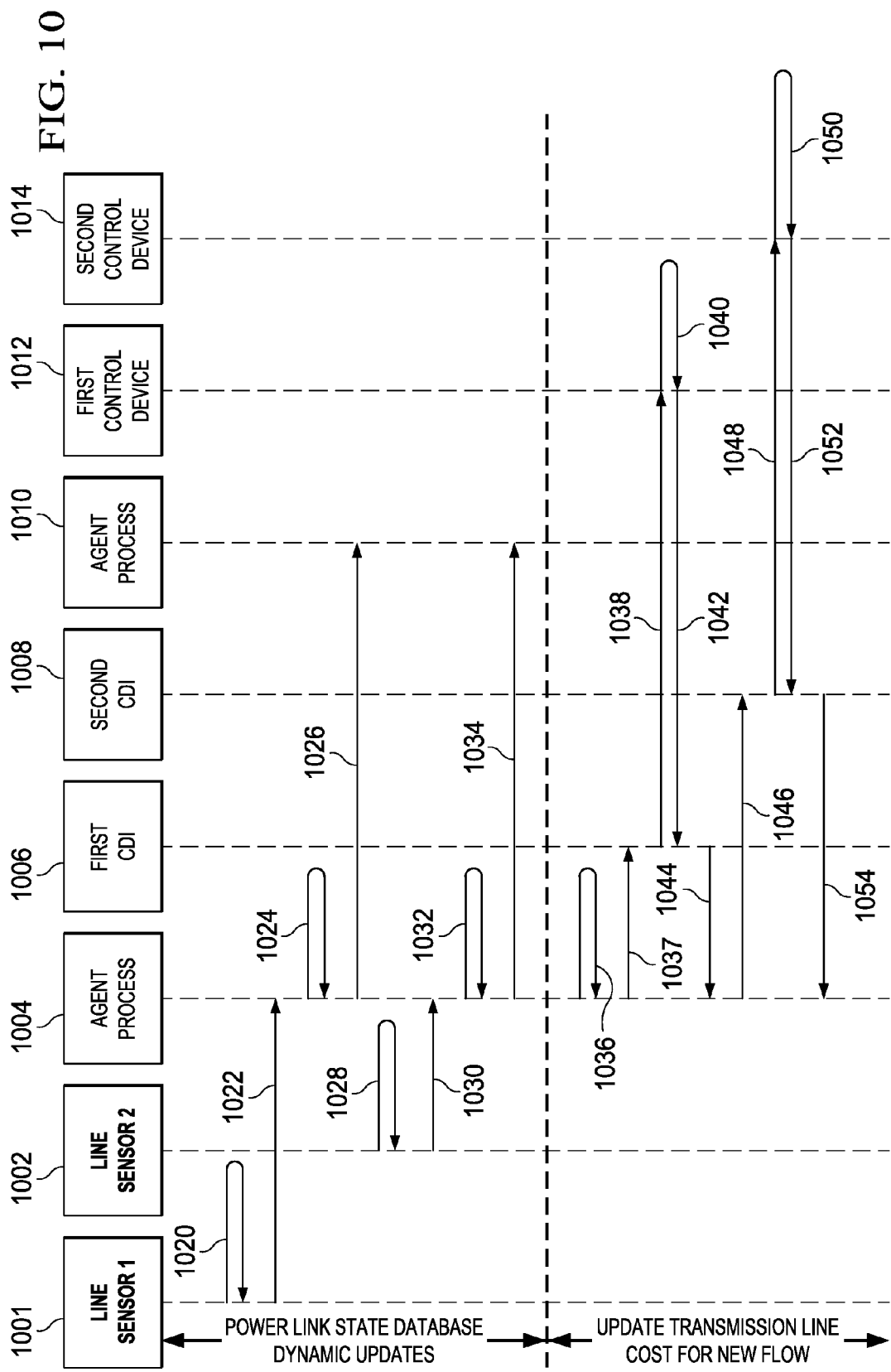

CONTROLLING VIRTUAL POWER CIRCUITS

CROSS-REFERENCE TO RELATED APPLICATION

This application is related to patent application Ser. No. 12/709,400, entitled "Network Centric Power Flow Control", filed even date hereof, and incorporated herein by reference.

BACKGROUND INFORMATION

1. Field

The present disclosure relates generally to electrical power and, in particular, to electrical power flow. Still more particularly, the present disclosure relates to a method and apparatus for creating a circuit for transmitting and distributing electrical power.

2. Background

An electrical power source supplies electrical power to loads. The electrical power source may generate electrical energy from mechanical, chemical, thermal, and/or other types of energy. The electrical power source transmits this electrical energy as electrical power to the loads. A source may also store electrical energy that has been generated previously. Electrical power may be delivered from a number of sources to a number of loads using an electrical power grid. An electrical power grid is comprised of a number of sources, loads, nodes, and power lines. A node is located at a connection of two or more power lines.

Power lines have impedance. Impedance is a measurement of the opposition to a current flow in a power line. The physical properties of a power line affect the amount of impedance in the power line. In an electrical power grid, this impedance in power lines leads to a loss of power in the electrical power grid. In other words, a portion of the electrical power carried in the power lines is consumed by the power lines.

In an electrical power grid, different power lines may have different levels of impedance. Additionally, the impedance of a power line may vary over the course of time. For example, the impedance of a power line decreases in cooler temperatures, such as during winter. The impedance of a power line increases when the power line is in warmer temperatures, such as during summer.

The demand for electrical power varies throughout the course of time. These variations in demand may lead to different amounts of power loss in the electrical power grid, while delivering the same amount of power to a load. Further, the cost of producing electrical power may vary for different electrical power sources and during the course of time.

One commonly used approach for reducing power loss in an electrical power grid is to increase the voltage across a power line. Increasing the voltage across power lines decreases the percentage of electrical power consumed by the power lines and increases the percentage of electrical power distributed to the loads. However, increasing the voltage across power lines may require additional safety precautions. In certain areas, increasing the voltage across power lines may be undesirable.

Currently, organizational boundaries may define the portions of an electrical power grid managed by different electric providers. These electric providers may not have the resources and/or ability to manage the flow of electrical power in the electrical power grid in portions of the electrical power grids across these organizational boundaries. In other words, one electric provider may only have the resources and/or ability to manage the portion of electrical power grids within an organizational boundary.

Therefore, it would be desirable to have a method and apparatus that may overcome one or more of the issues described above, as well as other possible issues.

SUMMARY

In still yet another advantageous embodiment, a method is present for controlling a number of circuits in an electrical power grid. A number of parameters in the number of circuits in the electrical power grid is monitored. Each circuit in the number of circuits comprises a plurality of nodes in the electrical power grid and a number of lines connected to the plurality of nodes in the electrical power grid. The number of lines is configured to carry electrical power. The plurality of nodes is configured to control the electrical power carried in the number of lines. A number of agent processes associated with the plurality of nodes is configured to communicate with each other using a communications network, configure the plurality of nodes in the electrical power grid into a circuit, and control a delivery of the electrical power through the circuit to a number of loads. A determination is made as to whether to make a change to the number of circuits based on the number of parameters and a policy. The number of circuits is changed using the policy in response to a determination to make the change to the number of circuits.

In another advantageous embodiment, a method is present for controlling power in an electrical power grid. A plurality of nodes and a number of lines connected to the plurality of nodes in the electrical power grid are selected to send electrical power from a number of sources to a number of loads based on a capacity to send the electrical power through the plurality of nodes and the number of lines. The plurality of nodes is configured into a circuit to carry the electrical power from the number of sources to the number of loads using the plurality of nodes. Parameters for the number of lines in the electrical power grid are monitored. A determination is made as to whether the parameters exceed threshold tolerances. The configuration of the plurality of nodes is adjusted in response to a determination that the parameters exceed threshold tolerances.

In yet another advantageous embodiment, an apparatus comprises a number of circuits in an electrical power grid and agent processes associated with the number of circuits. Each circuit in the number of circuits comprises a plurality of nodes in the electrical power grid and a number of lines connected to the plurality of nodes in the electrical power grid. The number of lines is configured to carry electrical power. The plurality of nodes is configured to control the electrical power carried in the number of lines. A number of agent processes associated with the plurality of nodes is configured to communicate with each other using a communications network, configure the plurality of nodes in the electrical power grid into the each circuit, and control a delivery of the electrical power through the each circuit to a number of loads. At least a portion of the agent processes is configured to monitor a number of parameters in the number of circuits in the electrical power grid, determine whether to make a change to the number of circuits based on the number of parameters and a policy, and change the number of circuits using the policy in response to the determination to make the change to the number of circuits.

In yet another advantageous embodiment, a method is present for controlling power in an electrical power grid. A plurality of nodes and a number of lines connected to the plurality of nodes in the electrical power grid are selected to send electrical power from a number of sources to a number of loads based on a capacity to send the electrical power through the plurality of nodes and the number of lines. The plurality of nodes and the number of lines are configured into a circuit to carry the electrical power from the number of sources to the number of loads using the plurality of nodes. Parameters for the number of lines in the circuit are monitored. A determination is made as to whether the parameters exceed threshold tolerances. A configuration of the plurality of nodes is adjusted in response to a determination that the parameters exceed threshold tolerances.

In still yet another advantageous embodiment, an apparatus comprises an electrical power grid comprising node and lines and agent processes associated with the nodes in the electrical power grid. At least a portion of the agent processes are configured to select a plurality of nodes in the nodes and a number of lines in the lines connected to the plurality of nodes in the electrical power grid to send electrical power from a number of sources to a number of loads based on a capacity to send the electrical power through the plurality of nodes and the number of lines. The at least a portion of the agent processes are configured to configure the plurality of nodes and the number of lines into a circuit to carry the electrical power from the number of sources to the number of loads using the plurality of nodes; monitor parameters for the number of lines in the circuit; determine whether the parameters exceed threshold tolerances; and adjust a configuration of the plurality of nodes in response to a determination that the parameters exceed the threshold tolerances.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 10 is an illustration of a message flow at a node in accordance with an advantageous embodiment;

DETAILED DESCRIPTION

Figure 1:
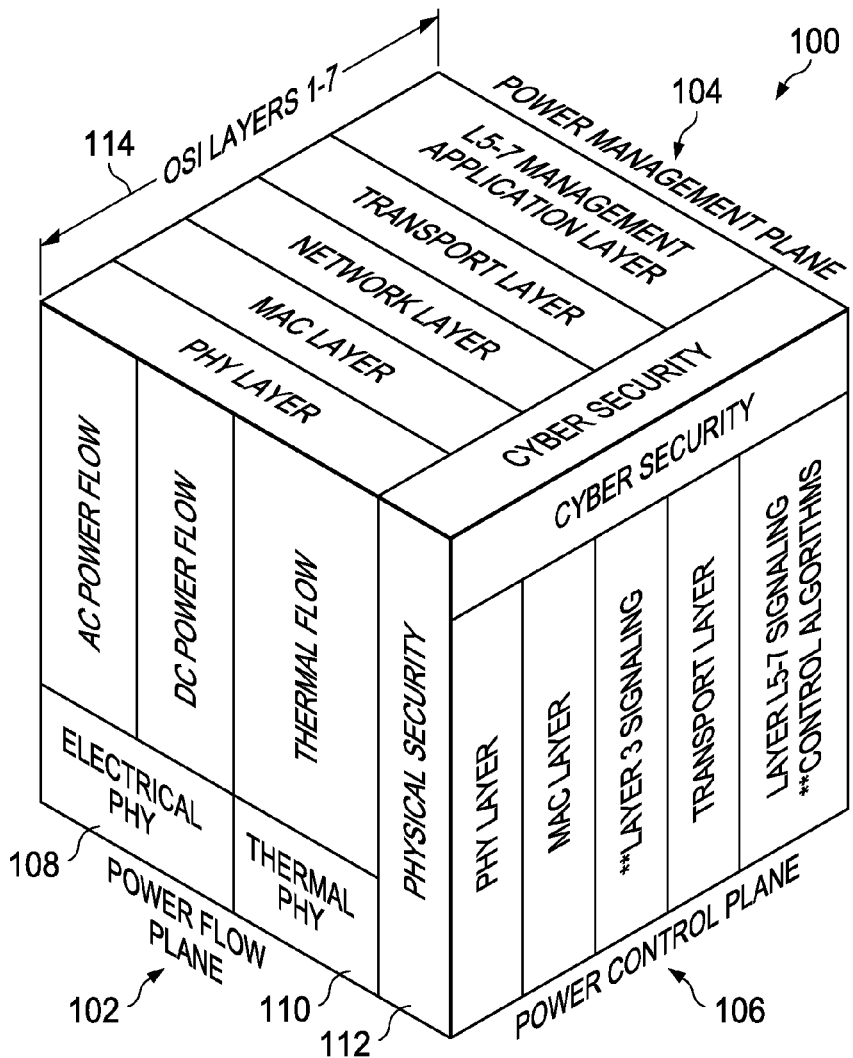
FIG. 1 is an illustration of a power model in accordance with an advantageous embodiment.

With reference now to FIG. 1, an illustration of a power model is depicted in accordance with an advantageous embodiment. In this illustrative example, power model 100 is a three-dimensional power model. Power model 100 may be used to model electrical power in an electrical power grid. More specifically, power model 100 allows power flow, power management, and power control for an electrical power grid to be treated independently of each other.

As depicted, power model 100 includes power flow plane 102, power management plane 104, and power control plane 106. In this illustrative example, power flow plane 102 includes physical aspects of the flow of electrical power through an electrical power grid. These physical aspects include electrical flow 108, thermal flow 110, and physical security 112.

In this illustrative example, power management plane 104 and power control plane 106 include layers 114, which are part of the Open System Interconnection (OSI) model. The Open System Interconnection model is a model of a communications and computer network architecture divided into seven layers.

Power management plane 104 includes functions performed by a centralized computer system to manage the flow of electrical power in an electrical power grid. For example, a centralized computer system may communicate with the portion of an electrical power grid within a boundary to manage the flow of electrical power within the boundary.

A boundary provides a separation for portions of an electrical power grid. The boundary may be, for example, a geographical boundary, an organizational boundary, an administrative boundary, or some other suitable type of boundary. For example, an organizational boundary may separate two portions of an electrical grid managed by two different electric providers.

Power control plane 106 includes functions performed by components associated with an electrical power grid across multiple organizational boundaries. These components include, for example, processes running on data processing systems associated with the electrical power grid. These processes may communicate autonomously to control the flow of electrical power through the electrical power grid. As used herein, the term "autonomously" means without human control and/or intervention.

The depiction of power model 100 in FIG. 1 is intended as an illustration and not as an architectural limitation for the different advantageous embodiments.

The different advantageous embodiments recognize and take into account a number of different considerations. For example, the different advantageous embodiments recognize and take into account that electrical power loss occurs in power lines of an electrical power grid. The different advantageous embodiments also recognize and take into account that using some portions of an electrical power grid to transfer electrical power may result in less electrical power loss than using other portions.

Further, the different advantageous embodiments recognize that it may be desirable to consume electrical power from selected sources in certain situations. These situations include, for example, a cost associated with a particular source, environmental preferences, and/or other types of situations.

The different advantageous embodiments recognize that currently, the flow of electrical power in an electrical power grid may not be controlled across organizational boundaries. Further, the different advantageous embodiments recognize and take into account that currently, portions of an electrical power grid are managed by operations centers. Each operations center may include a centralized computer system that manages the portions of the electrical power within an organizational boundary.

The different advantageous embodiments recognize and take into account that a network configured to allow components in an electrical power grid across organizational boundaries to communicate autonomously with each other is desirable. This type of communication allows the components in the electrical power grid to have control over the flow of electrical power without requiring input from the operations centers.

Thus, the different advantageous embodiments provide a method and apparatus for network centric power flow control. In one advantageous embodiment, an apparatus comprises a number of lines in an electrical power grid, a plurality of nodes in the electrical power grid, a communications network configured to carry information, and a number of agent processes associated with the plurality of nodes. The number of lines is configured to carry electrical power. The plurality of nodes is configured to control the electrical power carried on the number of lines. The number of agent processes is configured to communicate with each other using the communications network, configure the plurality of nodes in the electrical power grid into a circuit, and control a delivery of the electrical power through the circuit to a number of loads associated with the circuit.

Figure 2:
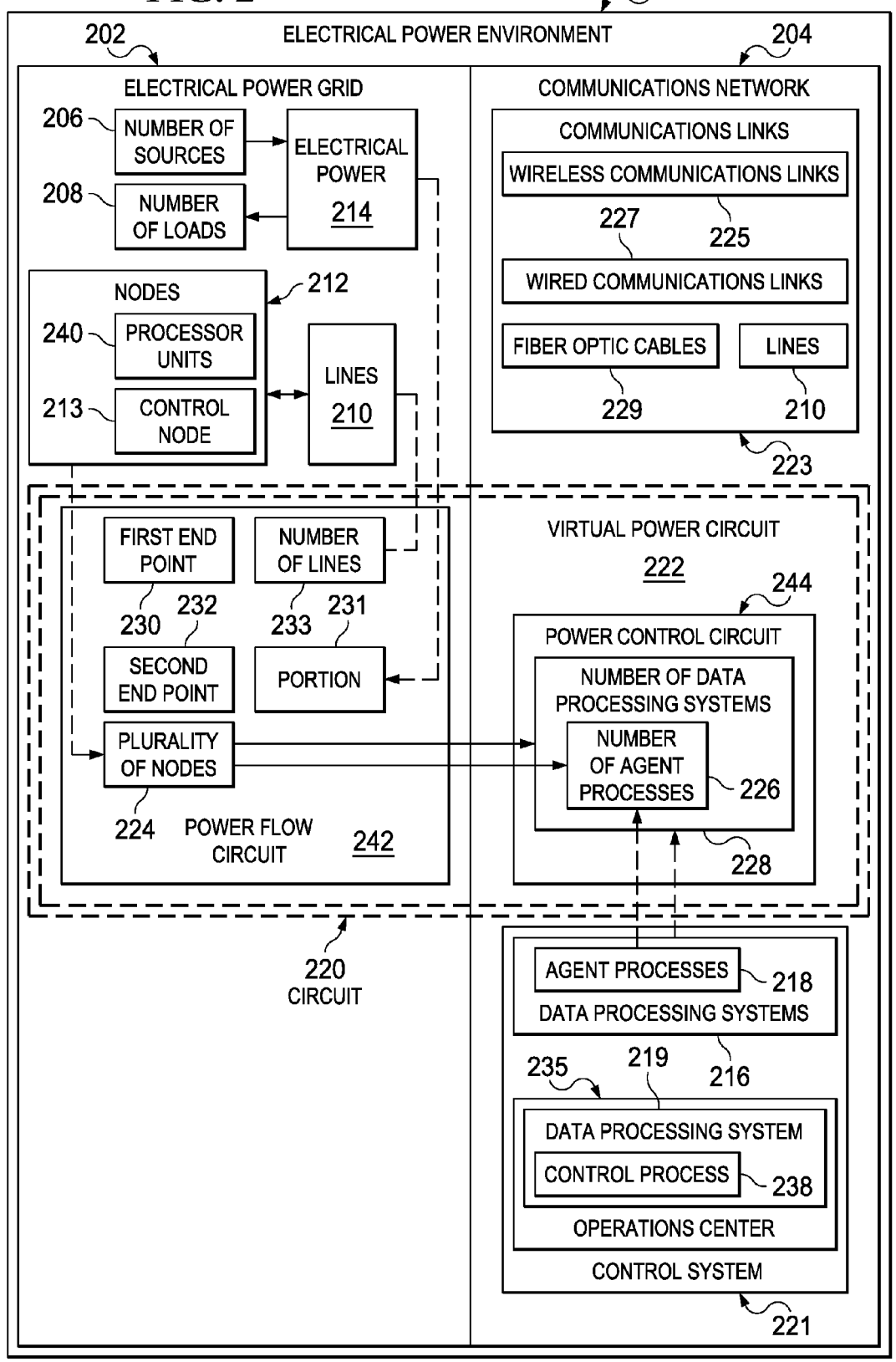
FIG. 2 is an illustration of a block diagram of an electrical power environment in accordance with an advantageous embodiment.

With reference now to FIG. 2, an illustration of a block diagram of an electrical power environment is depicted in accordance with an advantageous embodiment. In this illustrative example, electrical power environment 200 includes electrical power grid 202 and communications network 204. Electrical power grid 202 is configured for use with power flow plane 102 in FIG. 1. Communications network 204 is configured for use with power management plane 104 and/or power control plane 106 in FIG. 1.

As depicted in this example, electrical power grid 202 includes number of sources 206, number of loads 208, lines 210, and nodes 212. Electrical power grid 202 is configured to deliver electrical power 214 from number of sources 206 to number of loads 208. Lines 210 may be used to deliver electrical power 214 from number of sources 206 to number of loads 208. In this illustrative example, lines 210 take the form of transmission lines. More specifically, lines 210 take the form of electrical power lines.

Two or more lines in lines 210 are connected at a node in nodes 212. Nodes 212 transfer electrical power 214 carried in one line in lines 210 to one or more other lines in lines 210. Nodes 212 include at least one of a line sensor, a cooperative flexible alternating current transmission system device, an electronic filter, a phase shifter, a transformer, an adapter, a processor unit, and/or other suitable devices.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these depicted examples, lines 210 and nodes 212 are interconnected in electrical power grid 202. In other words, the flow of electrical power 214 through at least one of lines 210 and/or at least one of nodes 212 may affect the flow of electrical power 214 through other lines 210 and/or nodes 212. Further, the devices within a node in nodes 212 may affect the flow of electrical power 214 through other nodes 212.

In these illustrative examples, communications network 204 is associated with electrical power grid 202. A first component may be considered to be associated with a second component by being secured to the second component, bonded to the second component, fastened to the second component, and/or connected to the second component in some other suitable manner. For example, a first component may be connected to a second component through wires, wirelessly, or in some other manner. The first component also may be connected to the second component by a third component. The first component also may be considered to be associated with the second component by being part of and/or an extension of the second component.

Communications network 204 includes data processing systems 216 and communications links 223. Data processing systems 216 are associated with nodes 212. As one example, data processing systems 216 may be connected by wires to nodes 212. In these illustrative examples, each data processing system in data processing systems 216 is associated with a node in nodes 212. In other illustrative examples, only a portion of nodes 212 may be associated with data processing systems 216.

Agent processes 218 run on data processing systems 216. Agent processes 218 are software processes in the form of program code. Agent processes 218 are associated with at least a portion of nodes 212. This portion may be some or all of nodes 212.

In these illustrative examples, each of agent processes 218 runs on a different one of data processing systems 216 in these illustrative examples. In this manner, each agent process in agent processes 218 is associated with a node in nodes 212.

In these depicted examples, when a node in nodes 212 is associated with an agent process in agent processes 218, the node is referred to as control node 213. In some illustrative examples, a node in nodes 212 may be associated with more than one agent process in agent processes 218. For example, a data processing system in data processing systems 216 associated with a node in nodes 212 may run more than one of agent processes 218.

Communications network 204 allows the exchange of information between agent processes 218 running on data processing systems 216. Further, communications network 204 allows the exchange of information between a number of processes running on data processing system 219 and agent processes 218. In these examples, data processing system 219 may be part of operations center 235. Operations center 235 may be located outside of electrical power grid 202. An operator at operations center 235 may monitor and/or control the flow of electrical power 214 through electrical power grid 202 using communications network 204.

This exchange of information in communications network 204 occurs using communications links 223 in communications network 204. For example, agent processes 218 communicate with each other using communications links 223 in communications network 204.

Communications links 223 may include at least one of lines 210, wireless communications links 225, wired communications links 227, fiber optic cables 229, and other suitable communications links. Further, communications network 204 may include other types of devices, such as, for example, without limitation, switches, routers, and other suitable types of communications devices. In these depicted examples, communications network 204 may be implemented using an Internet Protocol (IP) network.

Agent processes 218 running on data processing systems 216 are part of control system 221 in electrical power environment 200. In other illustrative examples, control system 221 may include other processes running on other data processing systems. These other data processing systems may be located within and/or outside of electrical power grid 202. For example, control system 221 may include data processing system 219 in operations center 235.

In these illustrative examples, control system 221 is configured to control the flow of electrical power 214 through electrical power grid 202 using agent processes 218. More specifically, each agent process in agent processes 218 controls the flow of electrical power through the node in nodes 212 associated with the agent process.

In these illustrative examples, agent processes 218 in control system 221 communicate with each other using communications network 204 to form circuit 220. Circuit 220 is virtual power circuit 222 in these examples. Virtual power circuit 222 includes power flow circuit 242 and power control circuit 244. Power flow circuit 242 is formed within electrical power grid 202. Further, power flow circuit 242 operates within power flow plane 102 in FIG. 1. Power control circuit 244 is formed within communications network 204. Power control circuit 244 operates within power control plane 106 in FIG. 1.

Power flow circuit 242 is formed in electrical power grid 202 by first end point 230, second end point 232, plurality of nodes 224 in nodes 212, and number of lines 233 in lines 210. First end point 230 may be selected from one of a source in number of sources 206 and a node in plurality of nodes 224. Second end point 232 may be selected from one of a load in number of loads 208 and a node in plurality of nodes 224.

First end point 230, second end point 232, and plurality of nodes 224 are connected by number of lines 233 in lines 210. Virtual power circuit 222 carries portion 231 of electrical power 214 in electrical power grid 202 in number of lines 233 in these examples. Portion 231 may be some or all of electrical power 214, depending on the configuration of virtual power circuit 222.

Power flow circuit 242 in virtual power circuit 222 may share components with a number of other power flow circuits in electrical power grid 202. As one illustrative example, power flow circuit 242 may share at least a portion of number of lines 233 with another power flow circuit.

For example, a portion of the electrical power flowing in number of lines 233 may or may not have a same starting point as another portion of the electrical power flowing in number of lines 233. Further, a portion of the electrical power flowing in number of lines 233 may or may not be delivered to a same ending point as another portion of the electrical power flowing in number of lines 233. These different portions of electrical power flowing in number of lines 233 may be indistinguishable from each other. Further, these different portions of electrical power flowing in number of lines 233 may be indistinguishable in power flow plane 102 in FIG. 1.

In these depicted examples, plurality of nodes 224 is selected by agent processes 218 as a group. For example, one, some, or all of agent processes 218 selects plurality of nodes 224. In other words, plurality of nodes 224 for virtual power circuit 222 is selected by at least a portion of agent processes 218 in control system 221. At least a portion of agent processes 218 communicates with each other to identify number of agent processes 226 in agent processes 218 associated with plurality of nodes 224.

Number of agent processes 226 runs on number of data processing systems 228 associated with plurality of nodes 224. Number of agent processes 226 running on number of data processing systems 228 forms power control circuit 244 in virtual power circuit 222.

In these examples, the locations of number of data processing systems 228 in power control circuit 244 may follow the locations of plurality of nodes 224 in power flow circuit 242 in electrical power grid 202. In other words, power control circuit 244 may mirror power flow circuit 242 in these examples.

Number of agent processes 226 configures plurality of nodes 224 to be part of power flow circuit 242 in virtual power circuit 222. This configuring of plurality of nodes 224 may be based on a number of policies for number of agent processes 226. In some examples, an agent process in number of agent processes 226 may use more than one policy.

Further, the configuring of plurality of nodes 224 includes using communications network 204 to select number of lines 233 and reserve a capacity in number of lines 233 for the delivery of portion 231 of electrical power 214 through plurality of nodes 224. Number of agent processes 226 in power control circuit 244 monitors and controls the delivery and flow of portion 231 of electrical power 214 through number of lines 233 and plurality of nodes 224 in power flow circuit 242.

A line in a power flow circuit may carry different flows of electrical power 214 for different power flow circuits formed within electrical power grid 202. Different power control circuits within communications network 204 allow these different flows of electrical power 214 carried in the line to be distinguished from each other in power control plane 106 in FIG. 1. In other words, each power control circuit monitors and controls the flow of electrical power 214 for a particular power flow circuit.

The illustration of electrical power environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, control process 238 in control system 221 may run on data processing system 219 located outside of electrical power grid 202. Control process 238 may communicate with agent processes 218 through wireless communications links 225. Control process 238 may select number of agent processes 226 in agent processes 218 for power control circuit 244. Further, control process 238 may send commands to number of agent processes 226 to configure plurality of nodes 224 to be part of power flow circuit 242.

In yet other advantageous embodiments, agent processes 218 may be run on processor units 240 in nodes 212. For example, processor units 240 may be part of devices in nodes 212.

Figure 3:
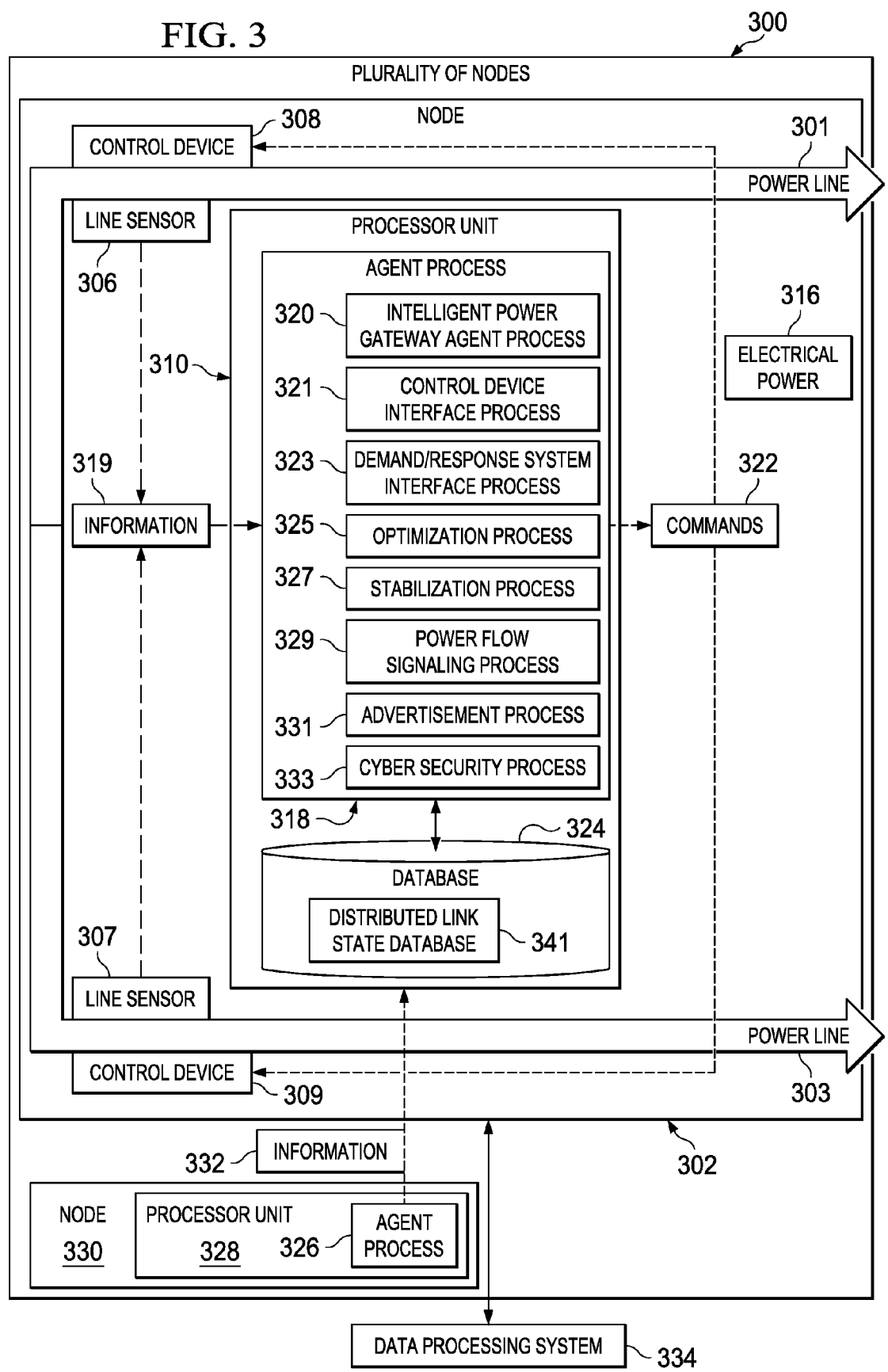
FIG. 3 is an illustration of a block diagram of a plurality of nodes in accordance with an advantageous embodiment.

With reference now to FIG. 3, an illustration of a block diagram of a plurality of nodes is depicted in accordance with an advantageous embodiment. In this illustrative example, plurality of nodes 300 is an example of one implementation for plurality of nodes 224 in FIG. 2. Plurality of nodes 300 is part of a circuit in an electrical power grid, such as circuit 220 in electrical power grid 202 in FIG. 2.

As depicted, plurality of nodes 300 includes node 302. Node 302 is located at the connection of power line 301 and power line 303. Node 302 includes line sensor 306, line sensor 307, control device 308, control device 309, and processor unit 310. Line sensor 306 and control device 308 are located on power line 301. Line sensor 307 and control device 309 are located on power line 303.

In this illustrative example, processor unit 310 may be implemented in a number of different devices, such as a data processing system, a node, a sensor, or some other suitable device. For example, the data processing system may be a data processing system in data processing systems 216 in FIG. 2. Examples of processor unit 310 include a digital signal processor, a controller, a central processing unit, a multi-core processor, or some other similar type of hardware component. Processor unit 310 is configured for communications with line sensor 306, line sensor 307, control device 308, and control device 309.

In this depicted example, agent process 318 runs on processor unit 310. Agent process 318 monitors, tracks, and controls the flow of electrical power 316 through node 302. Agent process 318 includes a number of processes. These processes include at least one of control device interface process 321, demand and response system interface process 323, optimization process 325, stabilization process 327, power flow signaling process 329, advertisement process 331, cyber security process 333, and other processes.

Different agent processes associated with plurality of nodes 300 may be configured to perform different operations, depending on the processes within the different agent processes. For example, some agent processes may be configured to perform only a single operation, while other agent processes may be configured to perform four or five different types of operations.

When agent process 318 includes control device interface process 321, demand and response system interface process 323, optimization process 325, stabilization process 327, power flow signaling process 329, advertisement process 331, and cyber security process 333, agent process 318 is referred to as intelligent power gateway agent process 320.

Intelligent power gateway agent process 320 may have more memory, more computing resources, and faster data transmission rates as compared to other types of agent processes. Intelligent power gateway agent process 320 may be in selected locations in an electrical power grid. These locations are selected to reduce latencies in the exchanging information, optimize data use, coordinate nodes in plurality of nodes 300 for load-balancing, and reduce the bandwidth used in exchanging of information.

In this illustrative example, line sensor 306 and line sensor 307 are configured to send information 319 about a number of parameters for power line 301 and power line 303, respectively, to agent process 318. Information 319 includes, for example, capacity for the power line, voltage, and/or other suitable information. A capacity for the power line may be a thermal capacity. Further, this capacity may vary with respect to time.

Information 319 may be sent to agent process 318 using a communications network, such as communications network 204 in FIG. 2. Information 319 is sent to agent process 318 in response to an event. This event may be, for example, without limitation, a request for information 319, the elapsing of a period of time, a beginning of a cycle in a signal, or some other suitable event. A request for information 319 may be made in response to a request for a service received by agent process 318. The service may include, for example, without limitation, translation of data, generation of alerts, providing of an interface for exchanging information, and/or other suitable operations.

Agent process 318 makes determinations about the flow of electrical power through node 302 using information 319. Agent process 318 sends commands 322 to control device 308 and/or control device 309 based on these determinations. Control device 308 and control device 309 are cooperative flexible alternating current transmission system (FACTS) devices in this illustrative example. Control device 308 and control device 309 are configured to change the flow of electrical power 316 through node 302 in response to receiving commands 322.

In this illustrative example, agent process 318 stores information 319 in database 324 in processor unit 310. Database 324 is a collection of information. Further, database 324 may be comprised of a number of processes and/or interfaces for accessing the collection of information.

Database 324 may be updated with information 319 when information 319 is received by agent process 318. In other illustrative examples, database 324 may be updated based on an event. The event may be, for example, without limitation, the elapsing of a period of time, receiving a request for an update to database 324, or some other suitable event.

Database 324 is distributed database 341 in these examples. Distributed database 341 contains information for other nodes in plurality of nodes 300 in addition to node 302. Distributed database 341 may be associated with all or part of plurality of nodes 300 in this illustrative example. For example, agent process 318 may send information 319 stored in distributed database 341 in node 302 to other agent processes in other nodes in plurality of nodes 300. These other agent processes may store information 319 in databases associated with these other nodes. These databases are substantially the same as distributed database 341 in these illustrative examples.

Further, in these illustrative examples, distributed database 341 may be distributed across organizational boundaries. In this manner, at least a portion of the agent processes for plurality of nodes 300 may exchange information across organizational boundaries to create and/or update distributed database 341.

As one illustrative example, agent process 326 runs on processor unit 328 associated with node 330 in plurality of nodes 300. Agent process 326 receives information 332 and stores information 332 in database 324 in processor unit 328. Agent process 326 also sends information 332 to agent process 318 using a communications network, such as communications network 204 in FIG. 2. Agent process 318 then stores information 332 in database 324 stored in processor unit 310. In this manner, plurality of nodes 300 may autonomously update database 324.

Information is stored in database 324 based on a number of factors. These factors may include, for example, without limitation, the type of information, the quality of information, a length of time for storage, the availability of storage space in database 324, and other suitable factors. The storage of information 319 in database 324 also may be based on a latency and/or throughput of the communications network used by the different agent processes.

In these illustrative examples, the agent processes associated with plurality of nodes 300 exchange information using standard TCP/IP network protocols. However, in some illustrative examples, the agent processes may exchange information using mobile objects. These mobile objects are program code containing information. This information may include information for the node, such as capacity information, routing information, and/or other suitable information. This information may also include, for example, program code for a new process, new rules and/or policies, software upgrades, and/or other suitable types of information.

The mobile objects may be sent to agent process 318 from an operations center. Agent process 318 reads the mobile object and stores the information within the mobile object. The mobile object clones itself. Agent process 318 sends these clones to other agent processes.

The illustration of plurality of nodes 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, processor unit 310 may be part of data processing system 334. Data processing system 334 may be connected to node 302 instead of being included in node 302. In other advantageous embodiments, processor unit 310 may be part of control device 308 and/or control device 309 in node 302.

In other advantageous embodiments, power lines, in addition to power line 301 and power line 303, may be connected to node 302.

In yet other illustrative examples, sensors in addition to or in place of line sensor 306 and/or line sensor 307 may be associated with power line 301 and/or power line 303. These sensors may be configured to detect parameters, such as, for example, without limitation, temperature, current flow, power phase, line tension, a location for the power lines, and/or other suitable parameters for the power lines.

In some illustrative examples, database 324 may be in a storage device connected to plurality of nodes 300. For example, database 324 may be in a storage device that may be accessed by agent process 318 and other agent processes associated with other nodes in plurality of nodes 300 using wireless communications links.

Figure 4:
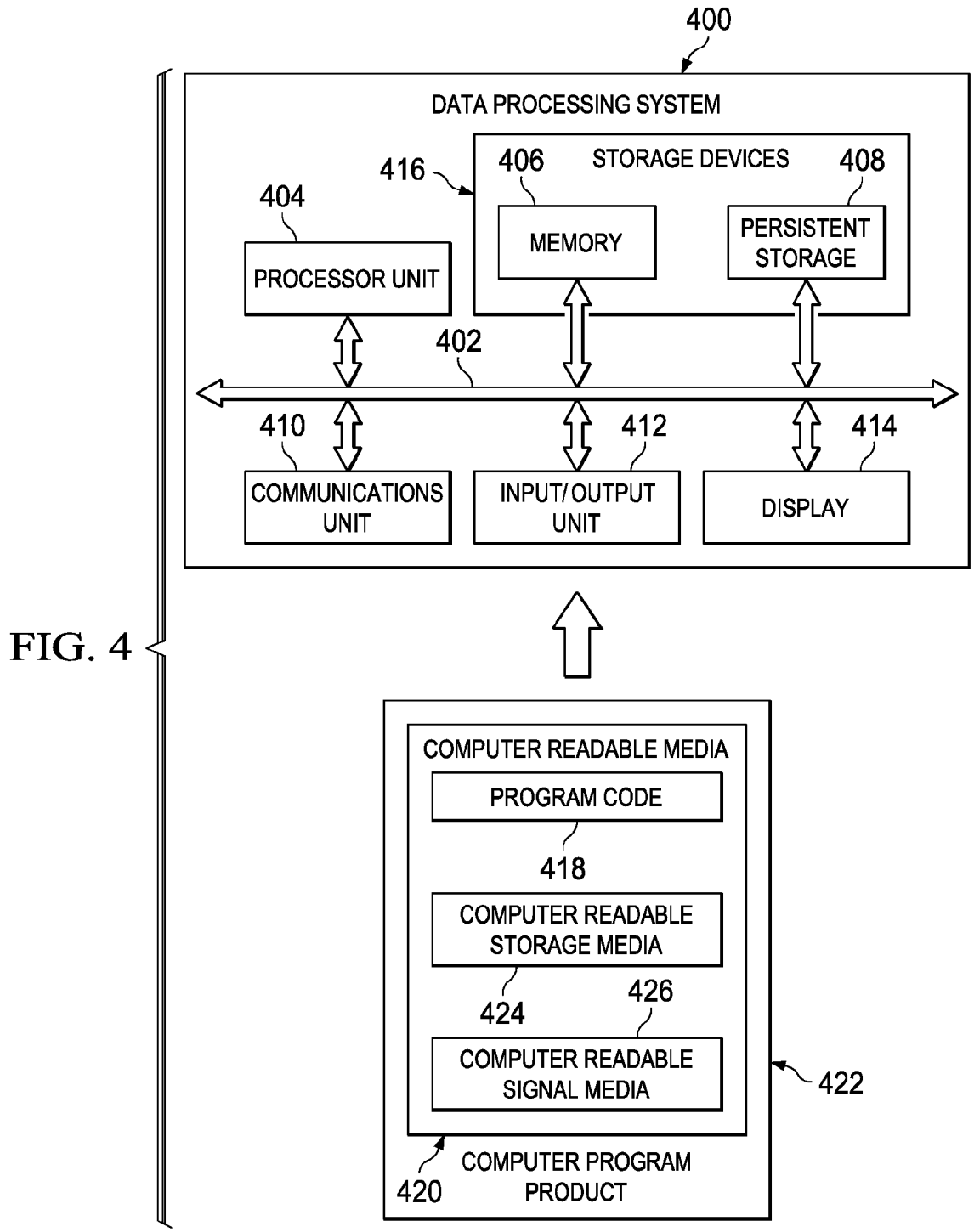
FIG. 4 is an illustration of a block diagram of a data processing system in accordance with an advantageous embodiment.

Turning now to FIG. 4, an illustration of a block diagram of a data processing system is depicted in accordance with an advantageous embodiment. In this illustrative example, data processing system 400 may be used to implement a data processing system in data processing systems 216 in FIG. 2 and/or processor unit 310 in FIG. 3. Data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, an optical fiber cable, a coaxial cable, a wire, and/or any other suitable type of communications link, as well as power lines. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network, such as, for example, communication network 204 in FIG. 2. This program code may be downloaded from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400.

Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache, such as found in an interface and memory controller hub that may be present in communications fabric 402.

Figure 5:
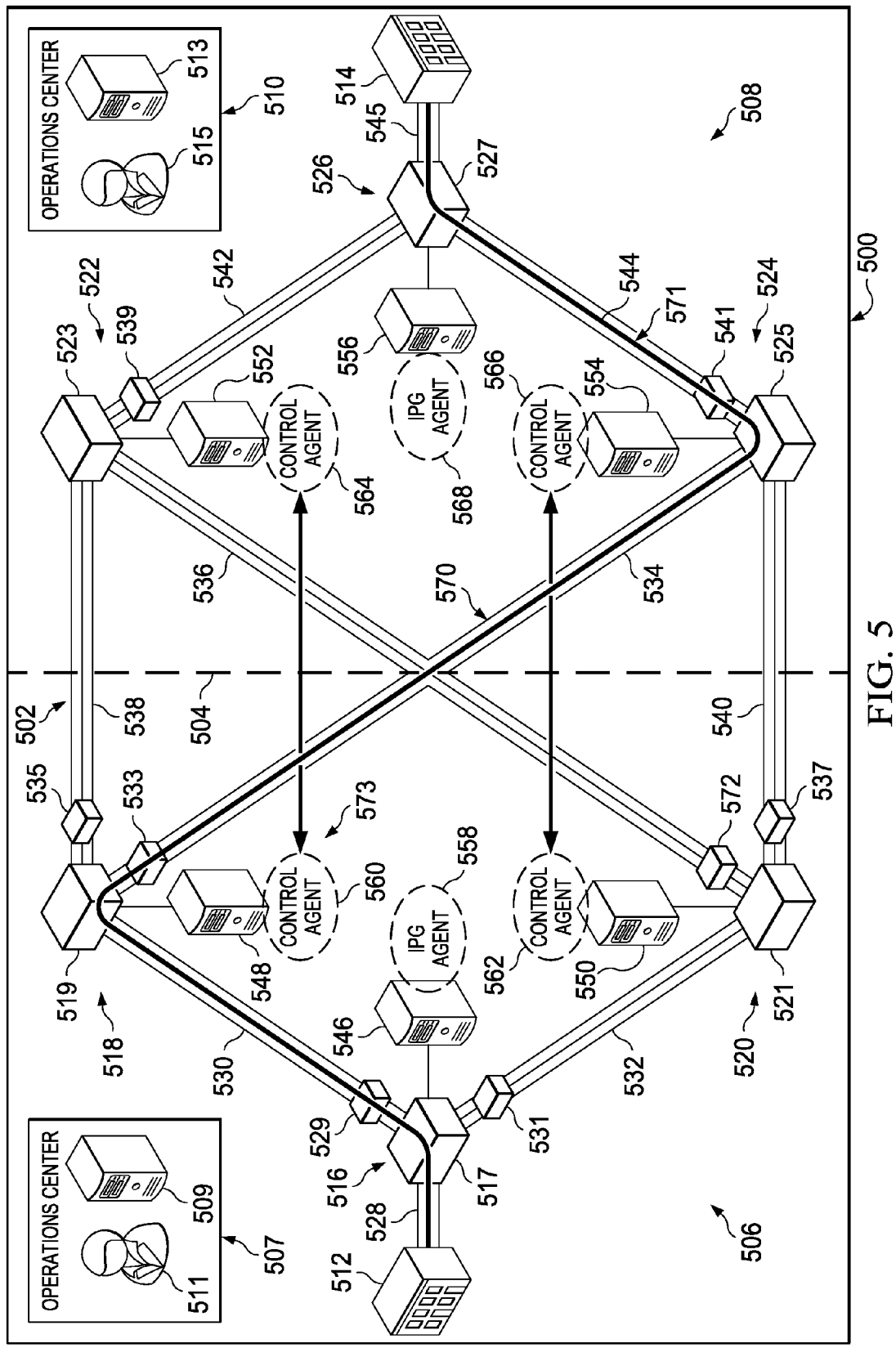
FIG. 5 is an illustration of an electrical power environment in accordance with an advantageous embodiment.

With reference now to FIG. 5, an illustration of an electrical power environment is depicted in accordance with an advantageous embodiment. In this illustrative example, electrical power environment 500 is an example of one implementation for electrical power environment 200 in FIG. 2. Electrical power environment 500 includes electrical power grid 502. Electrical power grid 502 is an example of one implementation for electrical power grid 202 in FIG. 2.

In this illustrative example, electrical power grid 502 has boundary 504. Boundary 504 separates portion 506 of electrical power grid 502 from portion 508 of electrical power grid 502. Further, boundary 504 prevents coordinated power management of portion 506 and portion 508. For example, boundary 504 may be a geographical boundary, an organizational boundary, an administrative boundary, or some other suitable type of boundary.

As one illustrative example, portion 506 of electrical power grid 502 may be managed by operations center 507, while portion 508 of electrical power grid 502 may be managed by operations center 510. Operations center 507 and operations center 510 may not be able to coordinate power management for electrical power grid 502 in this example.

As depicted, operations center 507 may include data processing system 509 operated by operator 511. Operations center 510 may include data processing system 513 operated by operator 515. In this illustrative example, electrical power grid 502 includes generator 512 and load 514. Generator 512 is an example of one implementation for a source in number of sources 206 in FIG. 2. Load 514 is an example of one implementation for a load in number of loads 208. Load 514 may be a home, a factory, a business, an appliance, or some other suitable type of load. Electrical power grid 502 is configured to deliver power supplied by generator 512 to load 514.

Electrical power grid 502 also includes nodes 516, 518, 520, 522, 524, and 526 along with power lines 528, 530, 532, 534, 536, 538, 540, 542, 544, and 545. Nodes 516, 518, 520, 522, 524, and 526 include control devices 517, 519, 521, 523, 525, and 527. These control devices are cooperative flexible alternating current transmission system (FACTS) devices in this illustrative example. However, in other illustrative examples, these control devices may be power semiconductor devices or other suitable types of devices.

Further, node 516 includes line sensor 529 located on power line 530 and line sensor 531 located on power line 532. Node 518 includes line sensor 533 located on power line 534 and line sensor 535 located on power line 538. Node 520 includes line sensor 572 located on power line 536 and line sensor 537 located on power line 540. Node 522 includes line sensor 539 located on power line 542. Node 524 includes line sensor 541 located on power line 544.

In this illustrative example, nodes 516, 518, 520, 522, 524, and 526 are connected to data processing systems 546, 548, 550, 552, 554, and 556, respectively. Agent processes 558, 560, 562, 564, 566, and 568 run on data processing systems 546, 548, 550, 552, 554, and 556, respectively. These agent processes control the flow of electrical power through nodes 516, 518, 520, 522, 524, and 526. In particular, the agent processes use a number of policies to control the flow of electrical power through the nodes.

Agent processes 558, 560, 562, 564, 566, and 568 may communicate autonomously with each other using communications links, such as communications links 223 in FIG. 2. These communications links are power lines 528, 530, 532, 534, 536, 538, 540, 542, 544, and 545 in this illustrative example. In particular, these communications links take the form of broadband over power lines. Agent processes 558, 560, 562, 564, 566, and 568 communicate with each other to form virtual power circuit 570.

Virtual power circuit 570 includes power flow circuit 571 and power control circuit 573. Power flow circuit 571 includes generator 512, node 516, node 518, node 524, node 526, load 514, and power lines 528, 530, 532, 538, 542, and 544. Power lines 528, 530, 532, 538, 542, and 544 connect generator 512, node 516, node 518, node 524, node 526, and load 514. Power flow circuit 571 in virtual power circuit 570 is configured to deliver electrical power from generator 512 to load 514.

Power control circuit 573 in virtual power circuit 570 includes agent processes 558, 560, 564, and 568 associated with nodes 516, 518, 524, and 526, respectively. Power control circuit 573 monitors and controls the flow of electrical power from generator 512 through nodes 516, 518, 524, and 526, and to load 514.

In this illustrative example, agent process 558 and agent process 568 are configured to perform a greater number of operations than agent processes 560, 562, 564, and 566. For example, agent process 558 and agent process 568 may be intelligent power gateway agent processes, such as intelligent power gateway agent process 320 in FIG. 3.

In this depicted example, agent process 558 and agent process 568 may exchange information with operations center 507 and operations center 510, respectively. This exchange of information allows operator 511 at operations center 507 and operator 515 at operations center 510 to manage portion 506 and portion 508, respectively, of electrical power grid 502 using agent process 558 and agent process 568, respectively.

Further, virtual power circuit 570 includes components from both portion 506 and portion 508 of electrical power grid 502. Different agent processes within power control circuit 573 in virtual power circuit 570 are selected to exchange information across boundary 504.

For example, agent process 560 and agent process 564 are selected to exchange information across boundary 504. Agent process 562 and agent process 566 are selected to exchange information across boundary 504. In these illustrative examples, these agent processes exchange information to create and/or update a distributed database, such as distributed database 341 in FIG. 3.

Figure 6:
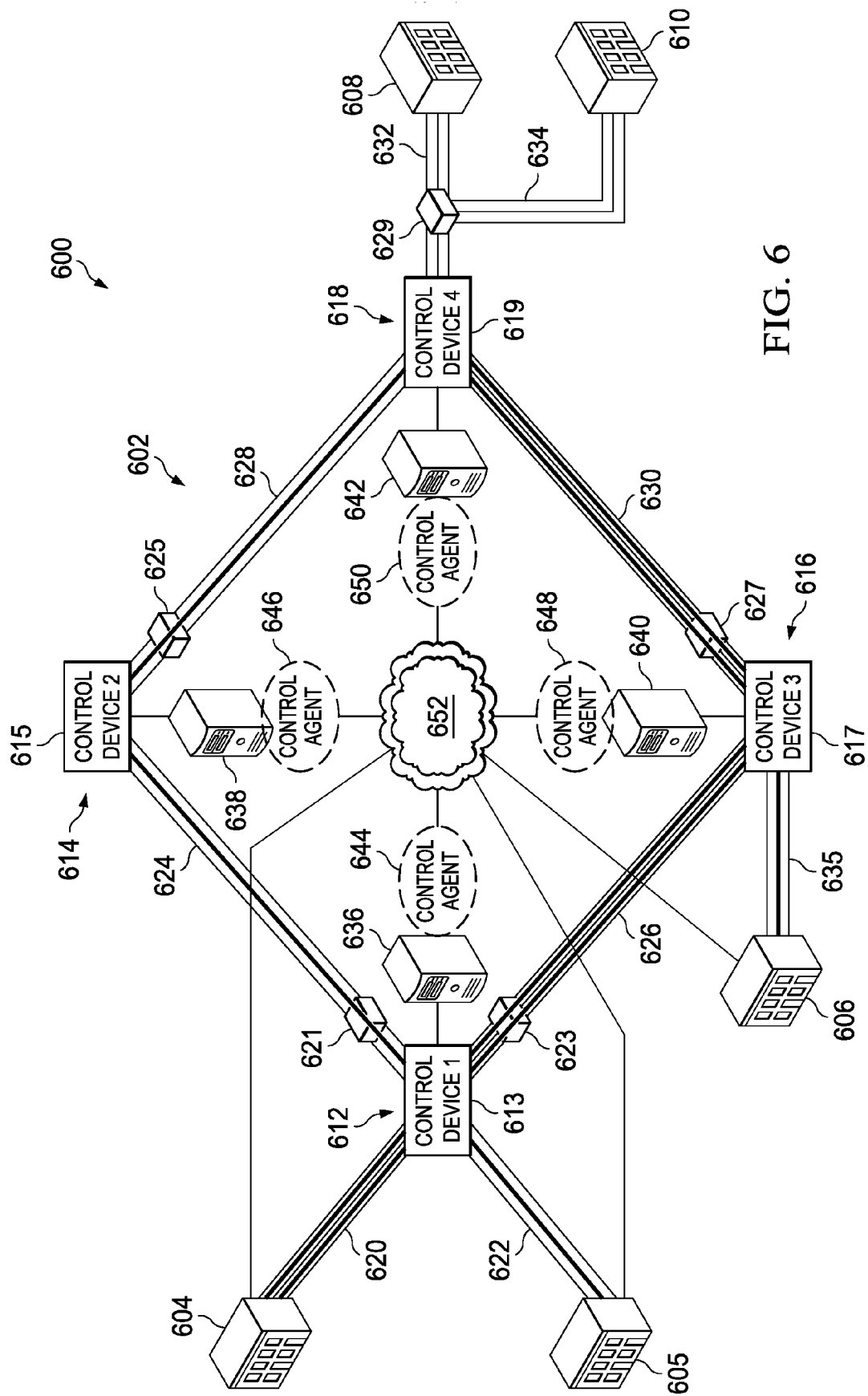
FIG. 6 is an illustration of an electrical power environment in accordance with an advantageous embodiment.

With reference now to FIG. 6, an illustration of an electrical power environment is depicted in accordance with an advantageous embodiment. In this illustrative example, electrical power environment 600 is an example of one implementation of electrical power environment 200 in FIG. 2. Electrical power environment 600 includes electrical power grid 602.

In this illustrative example, electrical power grid 602 includes generator 604, generator 605, generator 606, load 608, load 610, node 612, node 614, node 616, node 618, power line 620, power line 622, power line 624, power line 626, power line 628, power line 630, power line 632, power line 634, and power line 635.

Nodes 612, 614, 616, and 618 include control devices 613, 615, 617, and 619, respectively. These control devices are cooperative flexible alternating current transmission devices in this example. Further, node 612 includes line sensor 621 located on power line 624 and line sensor 623 located on power line 626. Node 614 includes line sensor 625 located on power line 628. Node 616 includes line sensor 627 located on power line 630. Node 618 includes line sensor 629 located on power line 632 and power line 634.

As depicted in this example, nodes 612, 614, 616, and 618 are connected to data processing systems 636, 638, 640, and 642. Agent processes 644, 646, 648 and 650 run on data processing systems 636, 638, 640, and 642, respectively. Agent processes 644, 646, 648 and 650 are associated with nodes 612, 614, 616, and 618, respectively. These agent processes control the flow of electrical power through the nodes.

Further, agent processes 644, 646, 648 and 650 communicate autonomously with each other using communications network 652. Communications network 652 is an example of one implementation for communications network 204 in FIG. 2. Communications network 652 provides communications through wireless communications links in this illustrative example.

Generators 604, 605, and 606 may also use communications network 652 to communicate with agent processes 644, 646, 648 and/or 650. Line sensors 621, 623, 625, 627, and 629 use communications network 652 to exchange information with agent processes 644, 646, 648 and 650.

A number of virtual power circuits may be formed in electrical power grid 602 to provide power supplied by at least one of generators 604, 605, and 606 to at least one of load 608 and load 610. For example, first virtual power circuit 660 may include generator 605, load 608, load 610, node 612, node 614, node 618, power line 622, power line 624, power line 628, power line 632, and power line 634. Agent processes 644, 646, and 650 configure nodes 612, 614, and 618 to be in first virtual power circuit 660.

Second virtual power circuit 662 may include generator 604, load 608, load 610, node 612, node 616, node 618, power line 620, power line 626, and power line 630. Agent processes 644, 648, and 650 configure nodes 612, 616, and 618 to be in the virtual power circuit 662.

Third virtual power circuit 664 may include generator 604, load 608, load 610, node 612, node 616, node 618, power line 620, power line 626, and power line 630. Agent processes 644, 648, and 650 configure nodes 612, 616, and 618 to be in third virtual power circuit 664. As depicted, power line 620, power line 626, and power line 630 carry flows of electrical power for both second virtual power circuit 662 and third virtual power circuit 664.

The flow of electrical power is different in second virtual power circuit 662 and in third virtual power circuit 664. A first portion of the electrical power flowing in power lines 620, 626, and 630 is for second virtual power circuit 662. A second portion of the electrical power flowing in power lines 620, 626, and 630 is for third virtual power circuit 664. However, these portions of electrical power in power lines 620, 626, and 630 for each of these virtual power circuits are indistinguishable in power flow plane 102 in FIG. 1.

Agent processes 644, 648, and 650 in second virtual power circuit 662 and in third virtual power circuit 664 are able to distinguish between these flows of electrical power through power lines 620, 626, and 630. Further, agent processes 644, 648, and 650 track, monitor, and control these multiple flows of electrical power. In this manner, virtual power circuits may be used to load balance the flow of electrical power through electrical power grid 602.

The illustrations of electrical power environment 500 in FIG. 5 and electrical power environment 600 in FIG. 6 are not meant to imply physical or architectural limitations to the manner in which different advantageous embodiments may be implemented. For example, in some advantageous embodiments, communications network 652 may provide communications through the power lines in electrical power grid 502. In other words, information may be exchanged using these power lines rather than wireless communications links.

Figure 7:
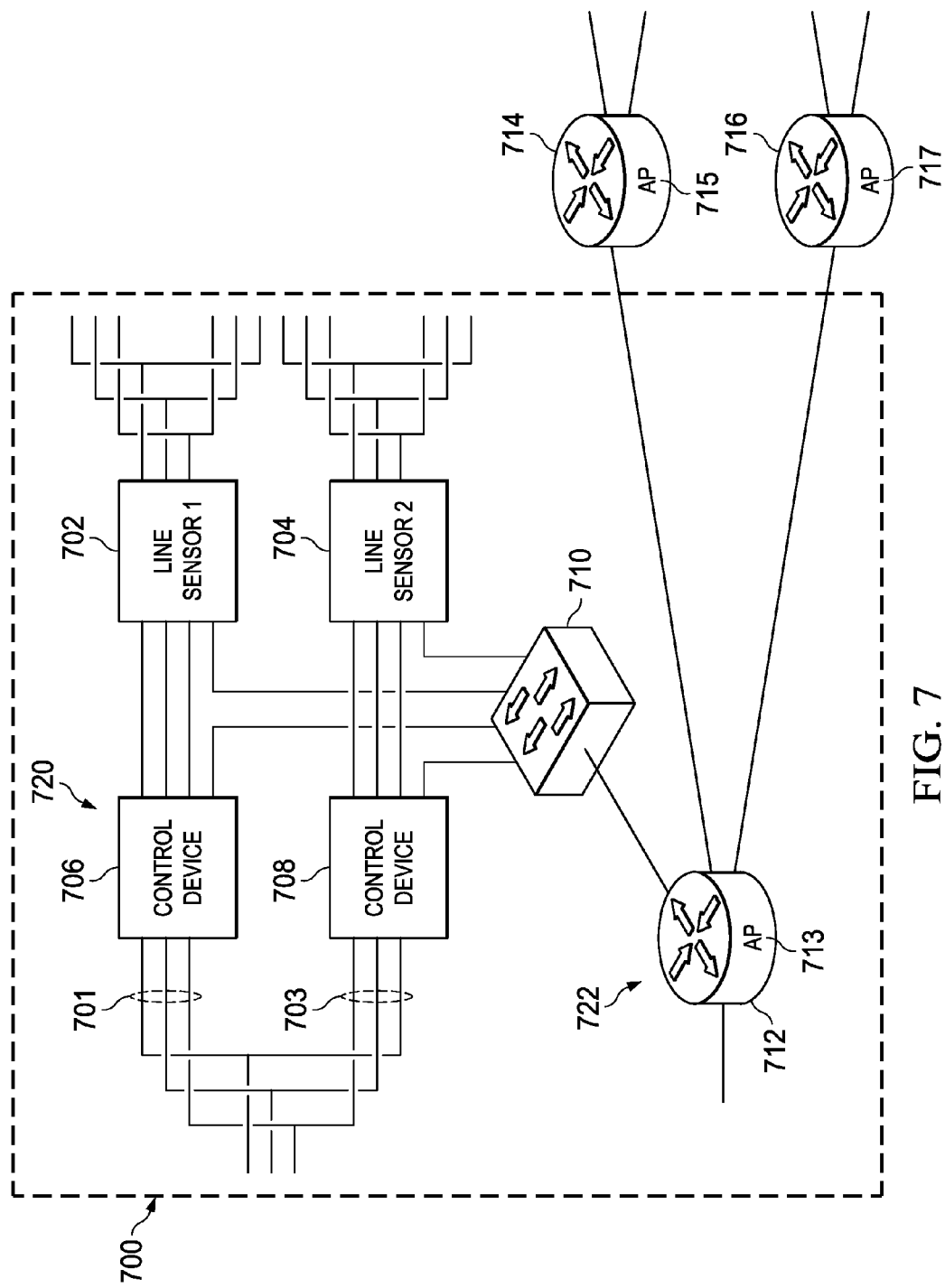
FIG. 7 is an illustration of a control node in accordance with an advantageous embodiment.

With reference now to FIG. 7, an illustration of a control node is depicted in accordance with an advantageous embodiment. In this illustrative example, control node 700 is an example of one implementation of a node in nodes 212 in FIG. 2. Further, control node 700 is an example of one implementation for node 302 in FIG. 3.

As depicted in this example, power line 701 and power line 703 are connected at control node 700. Control node 700 includes line sensor 702, line sensor 704, control device 706, control device 708, switch 710, and processor unit 712 in this illustrative example. Agent process 713 runs on processor unit 712.

Line sensor 702 and control device 706 are located on power line 701. Line sensor 704 and control device 708 are located on power line 703. Control device 706 and control device 708 are cooperative flexible alternating current transmission system (FACTS) devices in this illustrative example.

Line sensor 702 and line sensor 704 are configured to sense a number of parameters for power line 701 and power line 703, respectively. These parameters may include, for example, without limitation, electrical power capacity, temperature, current flow, power phase, line tension, a location of the power lines, and other suitable parameters for the power lines. In these examples, line sensor 702 and line sensor 704 are configured to store information for the number of parameters.

In this illustrative example, switch 710 allows line sensor 702, line sensor 704, control device 706, control device 708, and agent process 713 running on processor unit 712 to communicate with each other within control node 700. For example, line sensor 702 and line sensor 704 are configured to send the information for the number of parameters for power line 701 and power line 703, respectively, to processor unit 712 through switch 710.

In this illustrative example, agent process 713 running on processor unit 712 receives the information for the number of parameters sent from line sensor 702 and line sensor 704 through switch 710. Agent process 713 sends commands to control device 706 and/or control device 708 based on the information received.

In these illustrative examples, agent process 713 may make determinations about whether the flow of electrical power through power line 701 and/or power line 703 is within a desired threshold. Based on these determinations, agent process 713 may send commands to control device 706 and/or control device 708 to control the flow of electrical power through node 700.

In this illustrative example, agent process 713 running on processor unit 712 may exchange information with other agent processes associated with other control nodes. Exchanging information includes at least one of sending and receiving information. For example, agent process 713 may send information to agent process 715 running on processor unit 714 and/or agent process 717 running on processor unit 716. Processor unit 714 and processor unit 716 are each associated with a different control node.

In this depicted example, the information exchanged between agent process 713, agent process 715, and/or agent process 717 may be stored in a distributed database, such as distributed database 341 in FIG. 3.

In other illustrative examples, processor unit 712 may not be in control node 700. For example, processor unit 712 may be implemented in a data processing system connected to control node 700.

Figure 8:
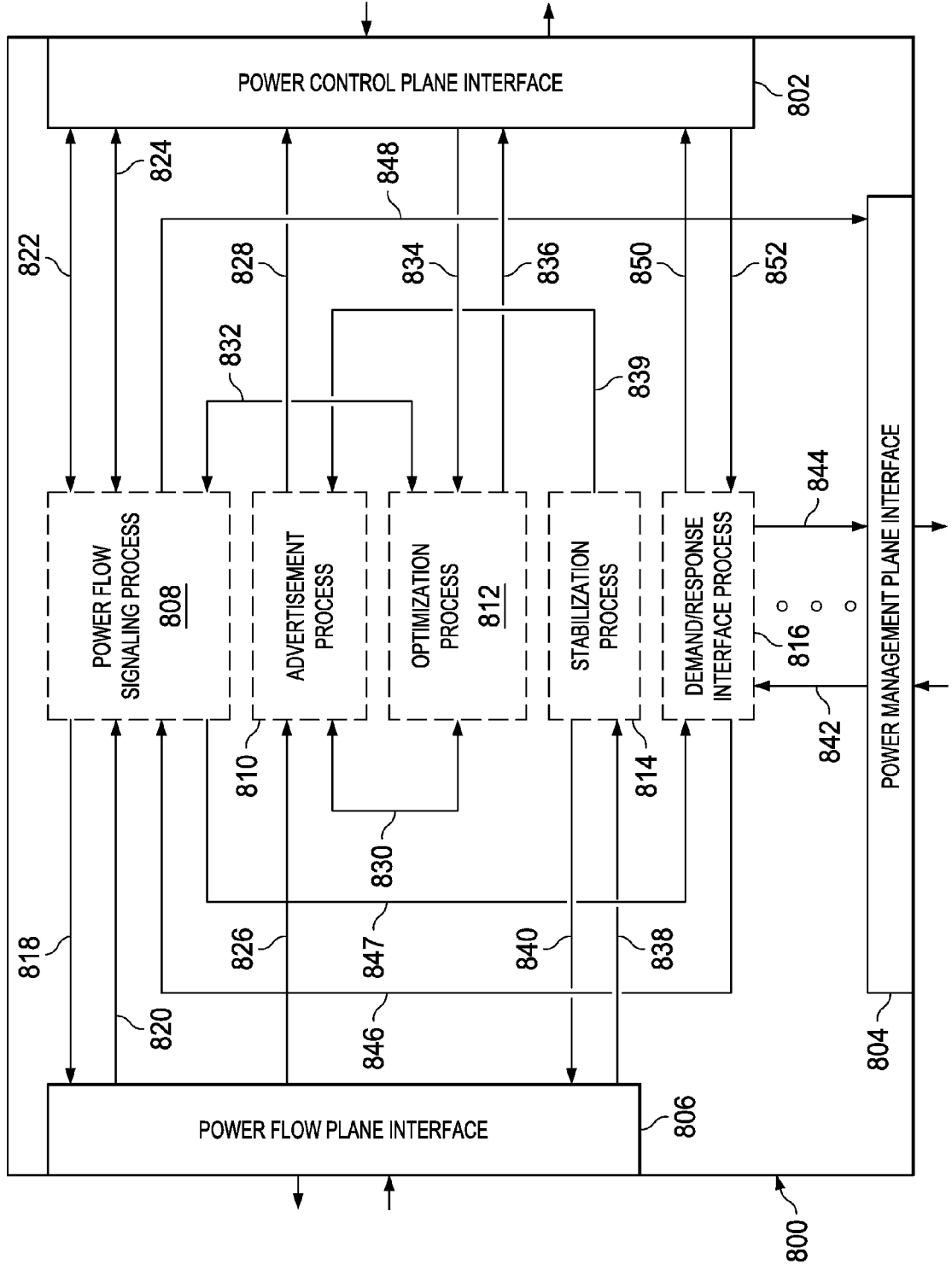
FIG. 8 is an illustration of an agent process in accordance with an advantageous embodiment.

With reference now to FIG. 8, an illustration of an agent process is depicted in accordance with an advantageous embodiment. In this illustrative example, agent process 800 is an example of one implementation for an agent process in agent processes 218 in FIG. 2 and/or agent process 318 in FIG. 3. Further, agent process 800 may be part of a virtual power circuit, such as virtual power circuit 222 in FIG. 2.

Agent process 800 includes power control plane interface 802, power management plane interface 804, and power flow plane interface 806. These interfaces may be, for example, Ethernet interfaces. Power control plane interface 802 allows communications between agent process 800 and other agent processes in an electrical power grid. Power management plane interface 804 allows communications between agent process 800 and an operations center. Power flow plane interface 806 allows communications between agent process 800 and the devices included in a node associated with agent process 800. The devices in the node may include, for example, a number of cooperative flexible alternating current transmission system devices, a number of line sensors, and other suitable devices.

Agent process 800 includes power flow signaling process 808, advertisement process 810, optimization process 812, stabilization process 814, and demand and response interface process 816. These processes allow agent process 800 to perform operations within power control plane 106 in FIG. 1.

In this illustrative example, power flow signaling process 808 sends request for capacity 818 to a control device in the node associated with agent process 800 using power flow plane interface 806. The control device may be, for example, cooperative flexible alternating current transmission system devices. The control device sends message 820 to power flow signaling process 808 to indicate that the request will be granted.

Power flow signaling process 808 also sends and/or receives requests for capacity 822 to and/or from other agent processes. Further, power flow signaling process 808 sends and/or receives messages 824 to and/or from other agent processes indicating that requests for capacity 822 will be granted. These agent processes are associated with nodes that may be, for example, along a path between a power source and a load.

Advertisement process 810 receives information 826 from the line sensor. Advertisement process 810 stores information 826 in a database, such as distributed database 341 in FIG. 3. Further, advertisement process 810 sends advertisement 828 to other agent processes. Advertisement 828 includes information 826. The other agent processes may then store information 826 in substantially similar databases. Information 826 may include, for example, without limitation, a capacity of a power line connected to the node associated with agent process 800, bus voltage, power flow, phase angle, and/or other suitable information.

In this illustrative example, optimization process 812 receives traffic engineering data 830 from advertisement process 810. Traffic engineering data 830 includes at least a portion of information 826 in this example, as well as other suitable information. For example, traffic engineering data 830 includes the power flow through and capacity of lines connected to the node associated with agent process 800, as well as other suitable information.

Optimization process 812 also receives virtual power circuit path information 832 from the other agent processes associated with other nodes. Virtual power circuit path information 832 includes information, such as, for example, the power flow through and capacity for other nodes and lines not part of the virtual power circuit in which agent process 800 is included.

Optimization process 812 uses traffic engineering data 830 and virtual power circuit path information 832 to optimize the flow of electrical power through an electrical power grid. For example, optimization process 812 may provision the node associated with agent process 800 to be in a virtual power circuit. This virtual power circuit is used to load balance power flow within the electrical power grid such that the flow of electrical power through the power lines in the electrical power grid is not greater than a capacity for the power lines.

Further, this optimization of the flow of electrical power by optimization process 812 reduces power loss within the electrical power grid, reduces a cost of delivering power within the electrical power grid, and reduces congestion in the electrical power grid. Further, this optimization also protects the control devices from operating outside of safety thresholds and increases power flow relative to the capacity of the electrical power grid. In these examples, a cost is a financial cost.

Optimization process 812 exchanges optimization information 834 with power flow signaling process 808. Power flow signaling process 808 may use optimization information 834 to configure the node associated with agent process 800 for optimization of the virtual power circuit. Further, optimization process 812 also sends optimization information 836 to the other agent processes in the virtual power circuit. The other agent processes may then use optimization information 836 to configure the other nodes associated with the other agent processes for optimization.

Optimization information 836 may include, for example, a configuration for a number of virtual power circuits in the electrical power grid that uses the capacity of the power lines in the electrical power grid with a desired efficiency.

Stabilization process 814 receives stability information 838 from the number of devices in the node associated with agent process 800. Stability information 838 may include values for a number of parameters for the number of devices. For example, stability information 838 may include voltage data, volts amps reactive (VAr) data, and other suitable types of data for the node.

For example, stability information 838 may indicate the presence of undesired fluctuations in the distribution of electrical power through the node. Commands 840 may be sent to a control device in the node to configure the control device to maintain a substantially desired distribution of electrical power through the node.

Further, stabilization process 814 also sends stability information 839 to advertisement process 810. Advertisement process 810 may store stability information 838 in the database. Further, advertisement process 810 may send stability information 839 to the other agent processes to be stored in the substantially similar databases.

Demand and response interface process 816 communicates with an operations center, such as operations center 507 and/or operations center 510 in FIG. 5. This communication is through power management plane interface 804. An operator at the operations center may send request 842 for information to demand and response interface process 816. This information may be from the number of devices in the node and/or from other devices in other nodes. Demand and response interface process 816 sends message 844 to indicate that request 842 will be granted.

Demand and response interface process 816 sends request for capacity 846 to power flow signaling process 808. In response to receiving request for capacity 846, power flow signaling process 808 sends request for capacity 818 to a control device in the node associated with agent process 800 and requests for capacity 822 to other agent processes. In particular, requests for capacity 822 are sent to a number of agent processes along a path between a power source and a load in the electrical power grid. This number of agent processes may be used to configure the nodes associated with the number of agent processes to be in a virtual power circuit.

In this depicted example, the node associated with agent process 800 and the nodes associated with the number of agent processes send message 820 and messages 824, respectively, to power flow signaling process 808. These messages indicate that request for capacity 818 and requests for capacity 824 will be granted. In other words, these messages indicate that the nodes are available and have the capacity to be part of the virtual power circuit.

In response to receiving message 820 and messages 824, power flow signaling process 808 sends message 847 to demand and response interface process 816 indicating that the request for the information will be granted.

In some illustrative examples, agent process 800 takes the form of an intelligent power gateway agent process, such as intelligent power gateway agent process 320 in FIG. 3. In these examples, demand and response interface process 816 is used to exchange information with other intelligent power gateway agent processes.

For example, demand and response interface process 816 may send request for power 850 to another intelligent power gateway agent process through power control plane interface 802. Demand and response interface process 816 receives message 852 from this intelligent power gateway agent process through power control plane interface 802 acknowledging request for power 850.

In this illustrative example, power flow signaling process 808 also sends information 848 to the operations center using power management plane interface 804. Information 848 is for the health and status of the virtual power circuit.

Figure 9:
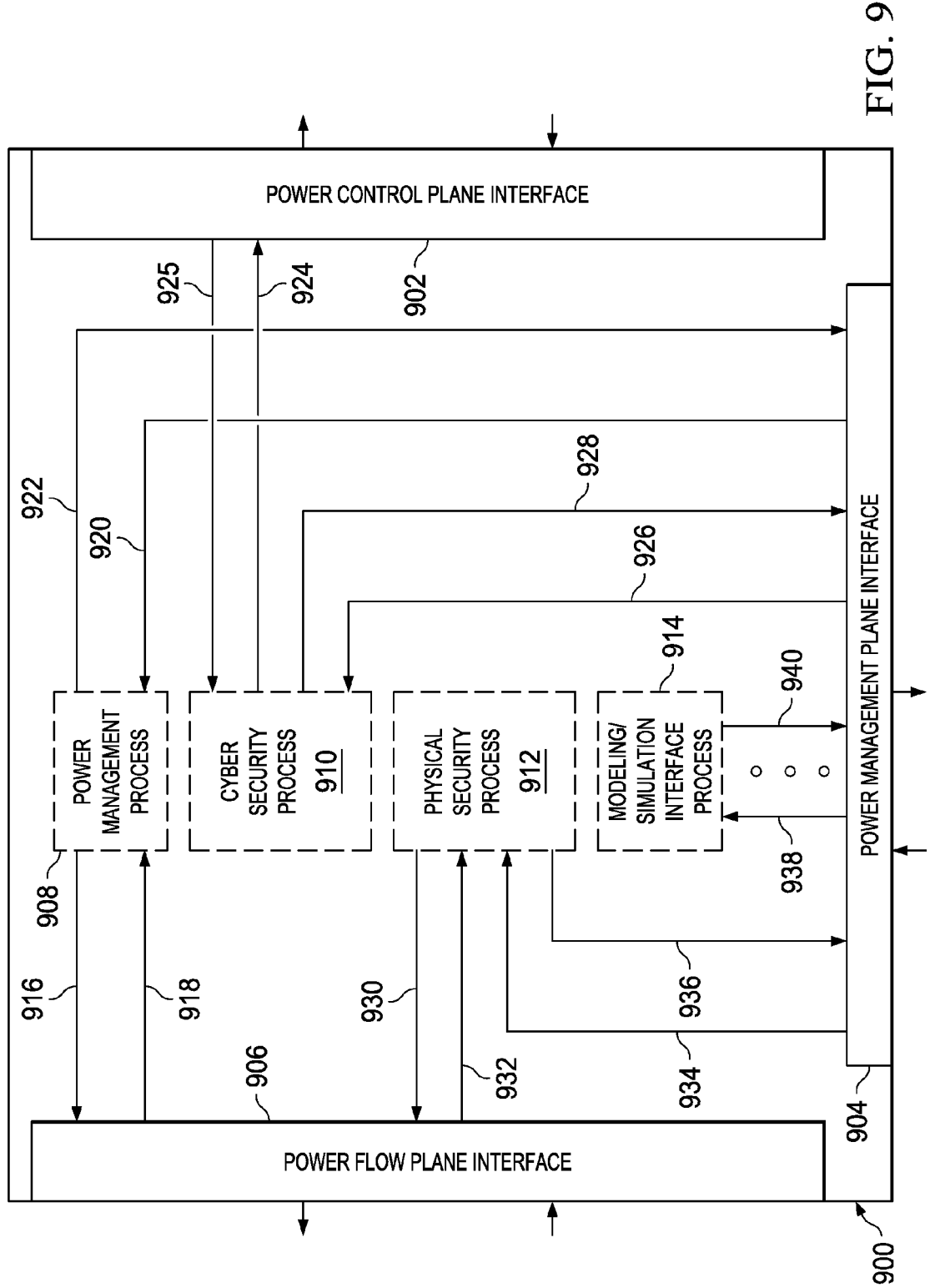
FIG. 9 is an illustration of an agent process in accordance with an advantageous embodiment.

With reference now to FIG. 9, an illustration of an agent process is depicted in accordance with an advantageous embodiment. In this illustrative example, agent process 900 is an example of one implementation for an agent process in agent processes 218 in FIG. 2 and/or agent process 318 in FIG. 3. As depicted in this example, agent process 900 includes power control plane interface 902, power management plane interface 904, and power flow plane interface 906. These interfaces may be, for example, Ethernet interfaces.

Agent process 900 also includes power management process 908, cyber security process 910, physical security process 912, and modeling/simulation interface process 914. These processes allow agent process 900 to perform operations in power management plane 104 in FIG. 1. Further, these processes, in this illustrative example, may be only a portion of the processes in agent process 900.

Power management process 908 sends commands and status requests 916 to a number of devices in the node associated with agent process 900. Commands and status requests 916 are for health and status information for the number of devices in the node associated with agent process 900. The number of devices sends responses 918 to power management process 908. Responses 918 include the requested health and status information in these examples. Power management process 908 may also receive commands and status requests 920 from an operations center. In response to commands and status requests 920, power management process 908 sends status information and responses 922 to the operations center.

Cyber security process 910 sends cyber security information 924 to other agent processes and receives cyber security information 925 from the other agent processes. Cyber security information 924 may include logs, alerts, security events, passwords, rules, thresholds, policies, and/or other suitable types of information. Further, cyber security process 910 receives commands and status requests 926 from the operations center. Cyber security process 910 sends cyber security information 928 to the operations center. Cyber security information 928 may include logs, alerts, security events, and/or other suitable types of information.

Physical security process 912 sends commands and status requests 930 to a number of devices in the node associated with agent process 900. Physical security process 912 receives physical security information 932 from the number of devices in the node. For example, commands and status requests 930 may be sent to a camera in the node. The camera may send back video in physical security information 932.

Further, physical security process 912 receives commands and status requests 934 from the operations center. Physical security process 912 sends physical security information 936 to the operations center. Physical security information 936 includes logs, physical security events, alerts, and/or other suitable information.

Modeling/simulation interface process 914 may perform simulations for the node associated with agent process 900. These simulations may be for a distribution of electrical power in the node.

Modeling/simulation interface process 914 receives request 938 from the operations center. Request 938 may be for information generated by running the simulations for the node. Modeling/simulation interface process 914 sends information 940 to the operations center.

In some illustrative examples, the processes in agent process 900 and the processes in agent process 800 in FIG. 8 may be processes associated with the same node. For example, agent process 800 and agent process 900 may both run on a processor unit in a node.

The processes in agent process 900 and the processes in agent process 800 in FIG. 8 may exchange information and/or work together to perform operations. For example, cyber security process 910 in agent process 900 may be used with advertisement process 810 in agent process 800.

As a more specific example, advertisement 828 may be sent from advertisement process 810 in agent process 800 to other agent processes only after cyber security information 924 is sent by cyber security process 910 in agent process 900 to the other agent processes. In this manner, the other agent processes may verify the node associated with agent process 900 and agent process 800.

With reference now to FIG. 10, an illustration of a message flow for advertising and changing the capacity at a node is depicted in accordance with an advantageous embodiment. The message flow illustrated in FIG. 10 may be implemented at a node, such as node 302 in FIG. 3 and/or node 700 in FIG. 7.

In this illustrative example, the message flow is for devices in the node. These devices include first line sensor 1001, second line sensor 1002, first agent process 1004, first control device interface 1006, second control device interface 1008, second agent process 1010, first control device 1012, and second control device 1014. First control device 1012 and second control device 1014 are cooperative flexible alternating current transmission system devices in this example. Further, first control device interface 1006 and second control device interface 1008 are located on first control device 1012 and second control device 1014, respectively.

First line sensor 1001 senses a change in the capacity for a first power line (step 1020). This capacity is a thermal capacity for the first power line. First line sensor 1001 reports the change in the capacity to agent process 1004 (message 1022). First agent process 1004 updates a database, such as distributed database 341 in FIG. 3, with the change in the capacity (step 1024). First agent process 1004 then advertises the change in the capacity to second agent process 1010 (message 1026).

Second line sensor 1002 senses a change in the capacity for a second power line (step 1028). Second line sensor 1002 reports the change in the capacity to first agent process 1004 (message 1030). First agent process 1004 updates the database with the change in the capacity (step 1032). First agent process 1004 then advertises the change in the capacity to second agent process 1010 (message 1034).

In this illustrative example, first agent process 1004 calculates a configured capacity for a new flow of electrical power through the node associated with agent process 1004 (step 1036). The configured capacity is different from the capacity for a power line. The capacity for the power line is a measured thermal capacity for the power line. The configured capacity is calculated for a desired flow of electrical power through each power line connected at the node. In other words, the configured capacity may be calculated to override the measured thermal capacity for the power line.

First agent process 1004 sends commands for first control device 1012 for the configured capacity to first control device interface 1006 (message 1037). First control device interface 1006 sends these commands to first control device 1012 (message 1038). First control device 1012 implements the changes for the configured capacity to provide the desired flow of electrical power in the first power line (step 1040). First control device 1012 sends a response to first control device interface 1006 indicating that the changes have been made (message 1042). First control device interface 1006 sends the response from first control device 1012 to first agent process 1004 (message 1044).

First agent process 1004 sends commands for second control device 1014 for the configured capacity to second control device interface 1008 (message 1046). Second control device interface 1008 sends these commands to second control device 1014 (message 1048). Second control device 1014 implements the changes for the configured capacity to provide the desired flow of electrical power in the first power line (step 1050). Second control device 1014 sends a response to second control device interface 1008 indicating that the changes have been made (message 1052). Second control device interface 1008 sends the response from second control device 1014 to first agent process 1004 (message 1054).

Figure 11A:
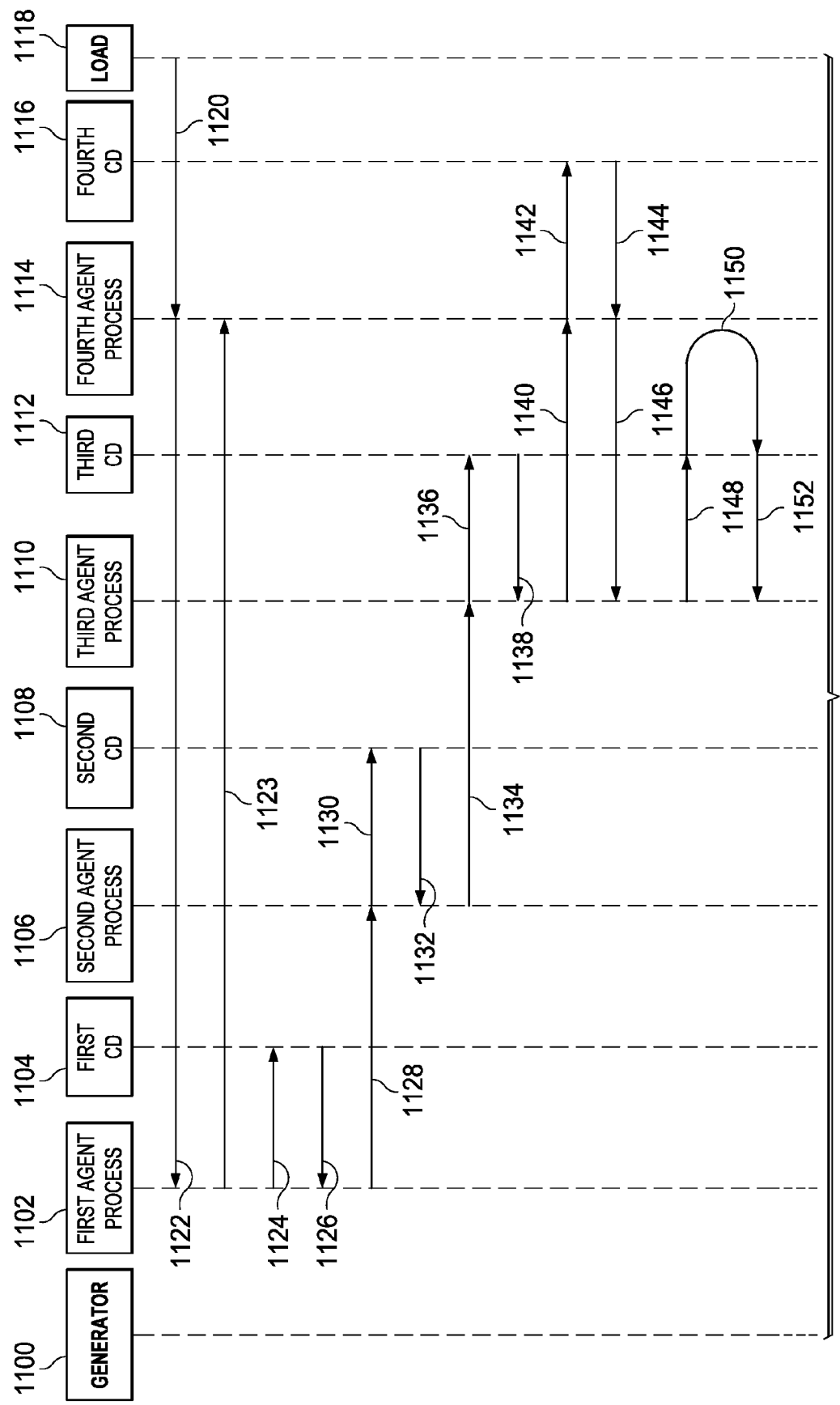
FIGS. 11A and 11B are illustrations of a message flow in an electrical power grid in accordance with an advantageous embodiment.
Figure 11B:
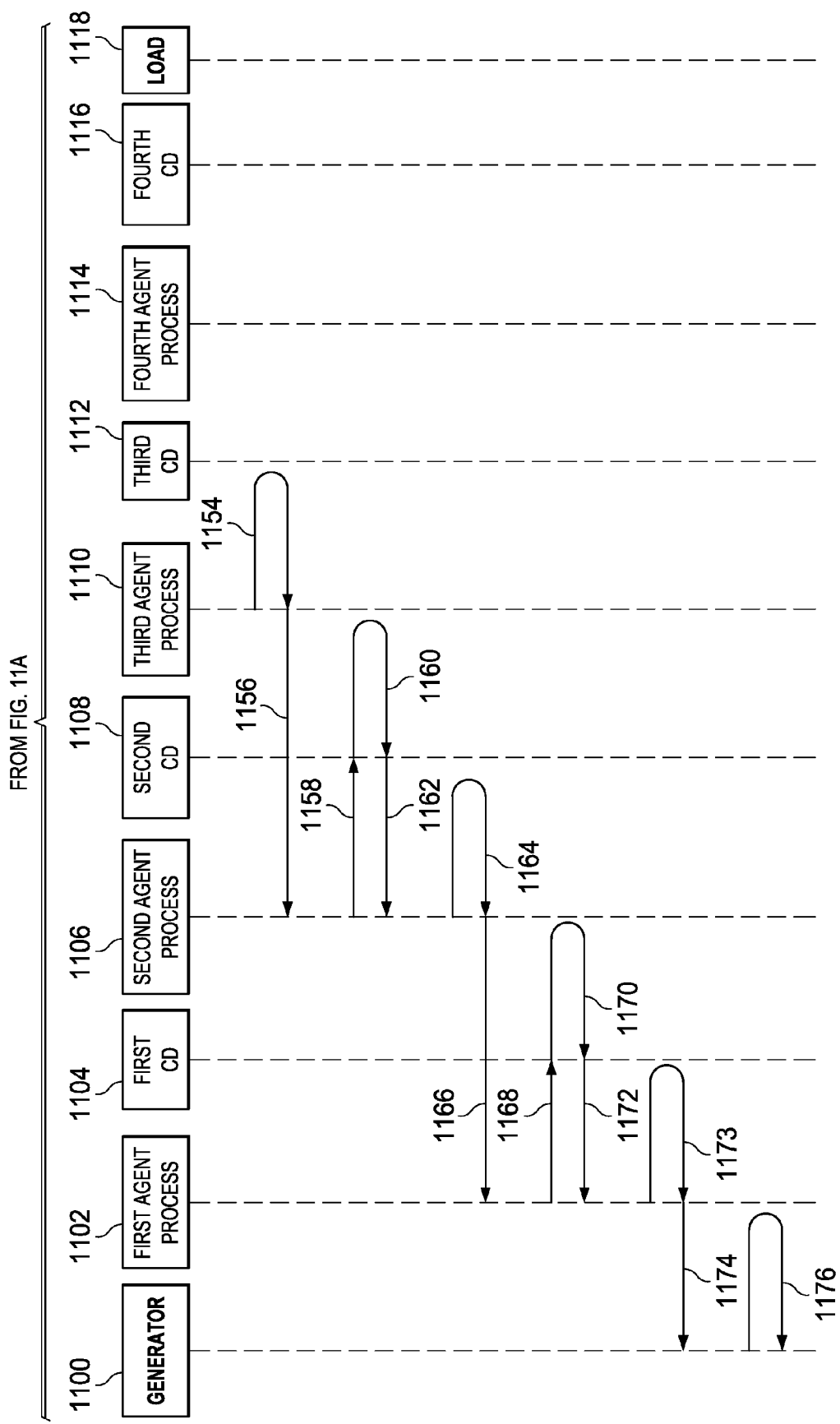

With reference now to FIGS. 11A and 11B, illustrations of a message flow for forming a virtual power circuit in an electrical power grid is depicted in accordance with an advantageous embodiment. The message flow illustrated in FIGS. 11A and 11B may be implemented in an electrical power grid, such as electrical power grid 202 in FIG. 2 and/or electrical power grid 502 in FIG. 5.

The virtual power circuit includes generator 1100, load 1118, and a first, second, third, and fourth node located between generator 1100 and load 1118 in an electrical power grid. This configuration for the virtual power circuit is an example of one implementation for a virtual power circuit, such as virtual power circuit 222 in FIG. 2. The different components in the virtual power circuit are connected power lines.

First agent process 1102 and first control device 1104 are associated with a first node connected to generator 1100. Second agent process 1106 and second control device 1108 are associated with a second node connected to the first node and to a third node. Third agent process 1110 and third control device 1112 are associated with the third node connected to the second node and a fourth node. Fourth agent process 1114 and fourth control device 1116 are associated with the fourth node connected to the third node and load 1118.

First agent process 1102 and fourth agent process 1114 are intelligent power gateway agent processes in this illustrative example.

A message indicating a change in load 1118 is sent to fourth agent process 1114 from load 1118 (message 1120). In response to the change in load 1118, fourth agent process 1114 sends a request for electrical power to first agent process 1102 (message 1122). First agent process 1102 sends a response to fourth agent process 1114 acknowledging the request (message 1123).

First agent process 1102 sends a request for capacity to first control device 1104 (message 1124). A request for capacity is a request to determine whether a node has a desired capacity for electrical power. In this illustrative example, the desired capacity is to allow the requested power to be delivered to load 1118. First control device 1104 sends a response to first agent process 1102 indicating that the first node has the desired capacity (message 1126).

First agent process 1102 sends a request for capacity to second agent process 1106 (message 1128). Second agent process 1106 sends the request for capacity to second control device 1108 (message 1130). Second control device 1108 sends a response to second agent process 1106 indicating that the second node has the desired capacity (message 1132).

Second agent process 1106 sends a request for capacity to third agent process 1110 (message 1134). Third agent process 1110 sends the request for capacity to third control device 1112 (message 1136). Third control device 1112 sends a response to third agent process 1110 indicating that the third node has the desired capacity (message 1138).

Third agent process 1110 sends a request for capacity to fourth agent process 1114 (message 1140). Fourth agent process 1114 sends the request for capacity to fourth control device 1116 (message 1142). Fourth control device 1116 sends a response to fourth agent process 1114 indicating that the fourth node has the desired capacity (message 1144).

Fourth agent process 1114 sends a response to third agent process 1110 granting the request for capacity (message 1146). Third agent process 1110 sends a confirmation of the capacity to third control device 1112 (message 1148). Third control device 1112 provisions the third node for the virtual power circuit (step 1150). Third control device 1112 sends information for the virtual power circuit to third agent process 1110 (message 1152). Further, third agent process 1110 advertises the capacity for the third node to the other agent processes (step 1154).

Third agent process 1110 sends a response to second agent process 1106 granting the request for capacity (message 1156). Second agent process 1106 sends a confirmation of the capacity to second control device 1108 (message 1158). Second control device 1108 provisions the second node for the virtual power circuit (step 1160). Second control device 1108 sends information for the virtual power circuit to second agent process 1106 (message 1162). Further, second agent process 1106 advertises the capacity for the second node to the other agent processes (step 1164).

Second agent process 1106 sends a response to first agent process 1102 granting the request for capacity (message 1166). First agent process 1102 sends a confirmation of the capacity to first control device 1104 (step 1168). First control device 1104 provisions the first node for the virtual power circuit (step 1170). First control device 1104 sends information for the virtual power circuit to first agent process 1102 (message 1172). First agent process 1102 advertises the capacity for the first node to the other agent processes (step 1173).

After all the nodes in the virtual power circuit are provisioned for the virtual power circuit, first agent process 1102 then sends a command to generator 1100 to begin generating the requested electrical power (message 1174). Generator 1100 begins generating the requested electrical power (step 1176).

In this illustrative example, the request for power is generated in response to a change in load 1118. However, in other illustrative examples, the request for power may be received from an operations center.

Figure 12:
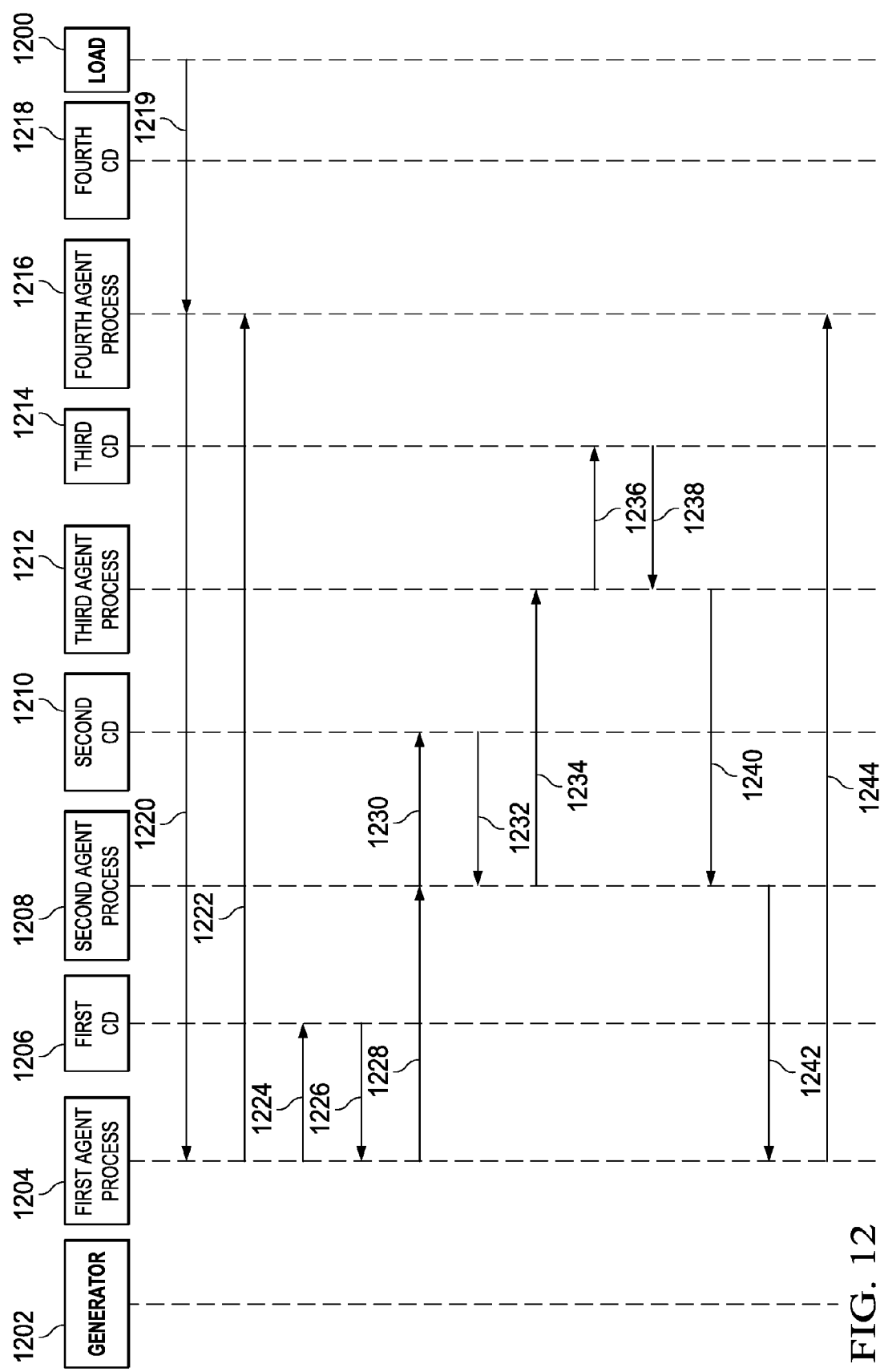
FIG. 12 is an illustration of a message flow in an electrical power grid in accordance with an advantageous embodiment.

With reference now to FIG. 12, an illustration of a message flow denying the formation of a virtual power circuit in an electrical power grid is depicted in accordance with an advantageous embodiment. The message flow illustrated in FIG. 12 may be implemented in an electrical power grid, such as electrical power grid 202 in FIG. 2 and/or electrical power grid 502 in FIG. 5.

An electrical power grid includes load 1200, generator 1202, a first node, a second node, a third node, and a fourth node. The first node is associated with first agent process 1204 and includes first control device 1206. The second node is associated with second agent process 1208 and includes second control device 1210. The third node is associated with third agent process 1212 and includes third control device 1214. The fourth node is associated with fourth agent process 1216 and includes fourth control device 1218.

In this illustrative example, a message indicating a load change at load 1200 is sent to fourth agent process 1216 (message 1219). Fourth agent process 1216 sends a request for power to first agent process 1204 (message 1220). First agent process 1204 sends a response to fourth agent process 1216 acknowledging the request (message 1222).

First agent process 1204 sends a request for capacity to first control device 1206 (message 1224). First control device 1206 sends a response to first agent process 1204 indicating that the first node has the desired capacity (message 1226).

First agent process 1204 sends a request for capacity to second agent process 1208 (message 1228). Second agent process 1208 sends the request for capacity to second control device 1210 (message 1230). Second control device 1210 sends a response to second agent process 1208 indicating that the second node has the desired capacity for electrical power (message 1232).

Second agent process 1208 sends a request for capacity to third agent process 1212 (message 1234). Third agent process 1212 sends the request for capacity to third control device 1214 (message 1236). Third control device 1214 sends a response to third agent process 1212 indicating that the third node does not have the desired capacity for electrical power (message 1238).

Third agent process 1212 sends a response to second agent process 1208 denying the request for capacity (message 1240). Second agent process 1208 sends a response to first agent process 1204 denying the request for capacity (message 1242). First agent process 1204 sends a response to fourth agent process 1216 denying the request for power (message 1244).

Figure 13:
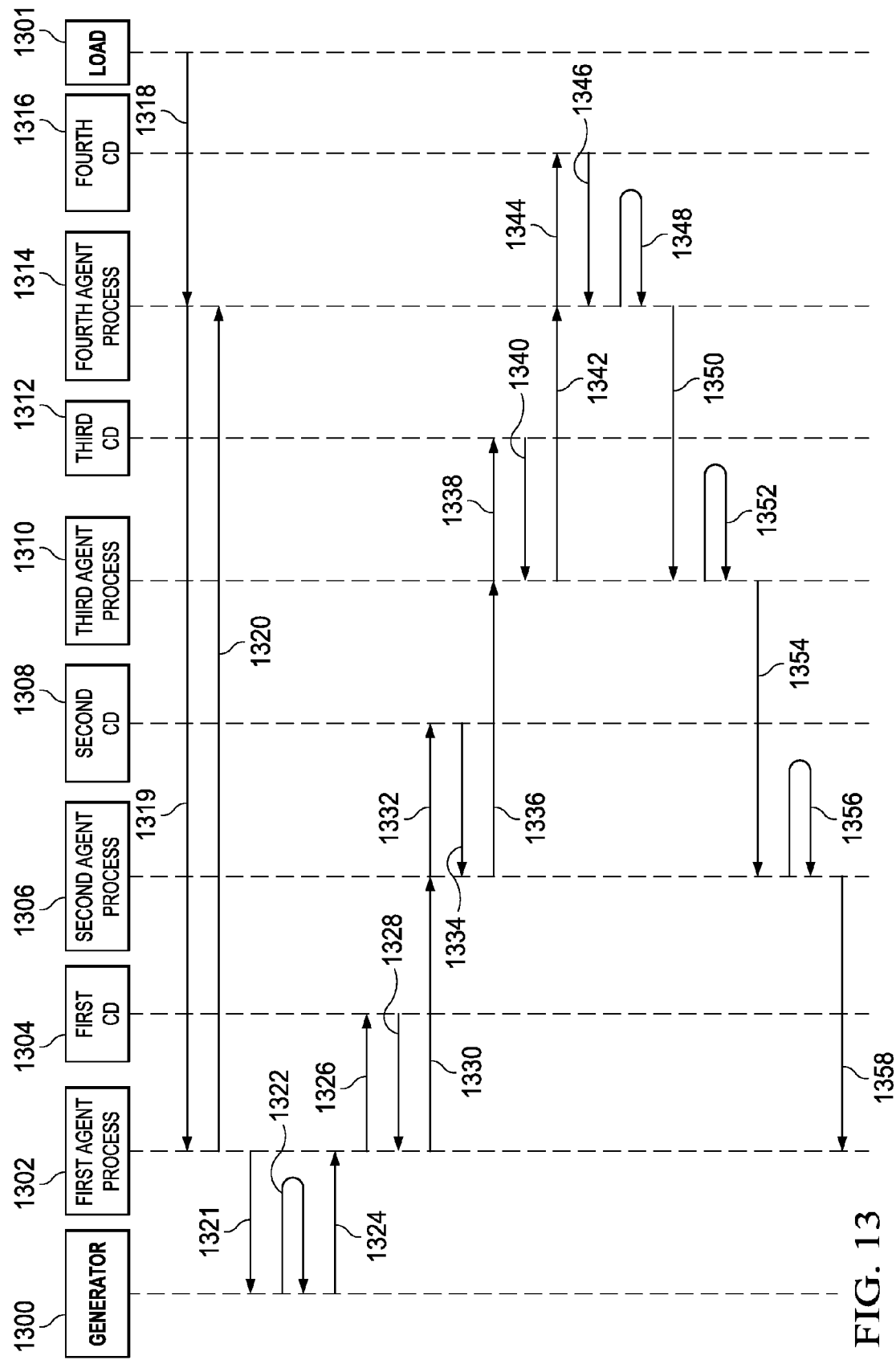
FIG. 13 is an illustration of a message flow for terminating a virtual power circuit in accordance with an advantageous embodiment.

With reference now to FIG. 13, an illustration of a message flow for terminating a virtual power circuit in an electrical power grid is depicted in accordance with an advantageous embodiment. The message flow illustrated in FIG. 13 may be implemented in an electrical power grid, such as electrical power grid 202 in FIG. 2 and/or electrical power grid 502 in FIG. 5. Further, the virtual power circuit terminated may be, for example, virtual power circuit 222 in FIG. 2 and/or virtual power circuit 570 in FIG. 5.

The virtual power circuit includes generator 1300, load 1301, a first node, a second node, a third node, and a fourth node. The first node is associated with first agent process 1302 and includes first control device 1304. The second node is associated with second agent process 1306 and includes second control device 1308. The third node is associated with third agent process 1310 and includes third control device 1312. The fourth node is associated with fourth agent process 1314 and includes fourth control device 1316.

As depicted in this example, a message indicating a load change in load 1301 is sent from load 1301 to fourth agent process 1314 (message 1318). Fourth agent process 1314 sends a request to stop a flow of electrical power to first agent process 1302 (message 1319). First agent process 1302 sends a response to fourth agent process 1314 acknowledging the request (message 1320).

First agent process 1302 sends a request to generator 1300 to stop supplying electrical power to the virtual power circuit (message 1321). In other words, the request is to tear down the virtual power circuit. In this illustrative example, tearing down the virtual power circuit involves freeing the capacity at the first node, the second node, the third node, and the fourth node and/or stopping the supply of electrical power by generator 1300.

Generator 1300 stops supplying electrical power to the virtual power circuit (step 1322). Generator 1300 sends a response to first agent process 1302 indicating the that the supplying of electrical power has been stopped (message 1324).

First agent process 1302 sends a command to first control device 1304 to make available the capacity in a power line carrying the electrical power (message 1326). First control device 1304 sends a confirmation to first agent process 1302 that the capacity has been made available (message 1328). First agent process 1302 sends a request to second agent process 1306 to tear down the virtual power circuit (message 1330).

Second agent process 1306 sends a command to second control device 1308 to make available the capacity in a power line carrying the electrical power (message 1332). Second control device 1308 sends a confirmation to second agent process 1306 that the capacity has been made available (message 1334). Second agent process 1306 sends a request to third agent process 1310 to tear down the virtual power circuit (message 1336).

Third agent process 1310 sends a command to third control device 1312 to make available the capacity in a power line carrying the electrical power (message 1338). Third control device 1312 sends a confirmation to third agent process 1310 that the capacity has been made available (message 1340). Third agent process 1310 sends a request to fourth agent process 1314 to tear down the virtual power circuit (message 1342).

Fourth agent process 1314 sends a command to fourth control device 1316 to make available the capacity in a power line carrying the electrical power (message 1344). Fourth control device 1316 sends a confirmation to fourth agent process 1314 that the capacity has been made available (message 1346).

The sending of an advertisement by fourth agent process 1314 for the capacity in the power line carrying the electrical power is triggered (step 1348). This advertisement is sent to a database, such as distributed database 341 in FIG. 3.

Fourth agent process 1314 sends a response to third agent process 1310 indicating that the fourth node is no longer part of the virtual power circuit (message 1350). The sending of an advertisement by third agent process 1310 for the capacity in the power line carrying the electrical power is triggered (step 1352). Third agent process 1310 sends a response to second agent process 1306 indicating that the third and fourth nodes are no longer part of the virtual power circuit (message 1354).

The sending of an advertisement by second agent process 1306 for the capacity in the power line carrying the electrical power is triggered (step 1356). Second agent process 1306 sends a response to first agent process 1302 indicating that the second, third, and fourth nodes are no longer part of the virtual power circuit (message 1358).

In this manner, the flow of electrical power from generator 1300 to load 1301 through the first, second, third, and fourth nodes is stopped.

Figure 14:
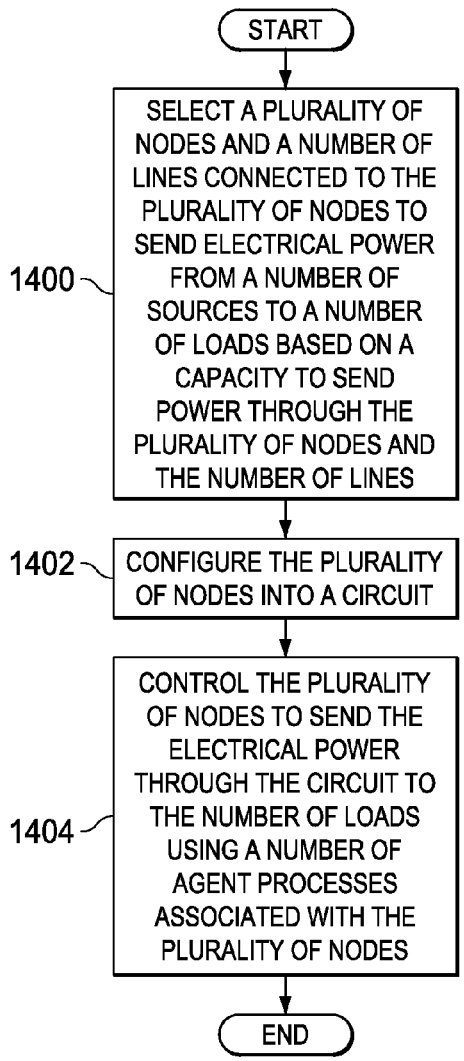
FIG. 14 is an illustration of a flowchart of a process for sending power to a number of loads in accordance with an advantageous embodiment.

With reference now to FIG. 14, an illustration of a flowchart of a process for sending power to a number of loads is depicted in accordance with an advantageous embodiment. The process illustrated in FIG. 14 may be implemented in an electrical power environment, such as electrical power environment 200 in FIG. 2 and/or electrical power environment 500 in FIG. 5.

The process begins by selecting a plurality of nodes and a number of lines connected to the plurality of nodes to send electrical power from a number of sources to a number of loads based on a capacity to send power through the plurality of nodes and the number of lines (operation 1400). The number of sources, the number of loads, the plurality of nodes, and the number of lines are components within an electrical power grid, such as electrical power grid 202 in FIG. 2.

Thereafter, the process configures the plurality of nodes into a circuit (operation 1402). In operation 1402, the circuit is a virtual power circuit. Further, the circuit is used to carry the electrical power from the number of sources to the number of loads. In this illustrative example, the number of loads is associated with the circuit. For example, the number of loads may be part of the circuit, connected to the circuit, and/or associated with the circuit in some other suitable manner.

The process then controls the plurality of nodes to send the electrical power through the circuit to the number of loads using a number of agent processes associated with the plurality of nodes (operation 1404), with the process terminating thereafter. In operation 1404, the number of agent processes may be implemented using agent process 318 in FIG. 3.

Figure 15:
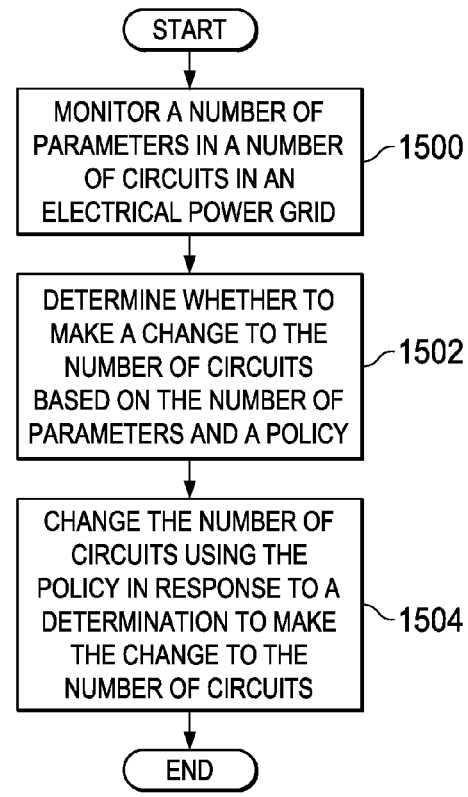
FIG. 15 is an illustration of a flowchart of a process for controlling a number of circuits in an electrical power grid in accordance with an advantageous embodiment.

With reference now to FIG. 15, an illustration of a flowchart of a process for controlling a number of circuits in an electrical power grid is depicted in accordance with an advantageous embodiment. The process illustrated in FIG. 15 may be implemented in an electrical power environment, such as electrical power environment 200 in FIG. 2. Further, this process may be implemented in electrical power environment 600 in FIG. 6.

The process begins by monitoring a number of parameters in a number of circuits in an electrical power grid (operation 1500). In operation 1500, monitoring may include receiving information for the number of parameters from sensors associated with the number of circuits in the electrical power grid. The number of parameters includes, for example, without limitation, a capacity in a line, a temperature in a line, a presence of a voltage having a value greater than a desired level, and a reduction in a capacity in a line.

Each circuit in the number of circuits includes a number of lines and a plurality of nodes in the electrical power grid. The number of lines is configured to carry electrical power to a number of loads. The plurality of nodes is configured to control the electrical power carried in the number of lines.

The plurality of nodes is associated with a number of agent processes. The number of agent processes is configured to communicate with each other using a communications network, such as communications network 204 in FIG. 2. The number of agent processes configures the plurality of nodes in the electrical power grid into a circuit in the number of circuits. The number of agent processes also controls a delivery of the electrical power through the circuit in the number of circuits to the number of loads.

Thereafter, the process determines whether to make a change to the number of circuits based on the number of parameters and a policy (operation 1502). The process then changes the number of circuits using the policy in response to a determination to make the change to the number of circuits (operation 1504), with the process terminating thereafter.

In operation 1504, the number of circuits may be changed in a number of different ways. For example, changing the number of circuits may involve changing a configuration of at least a portion of the plurality of nodes for at least one circuit in the number of circuits. In other examples, changing the number of circuits may involve adding a new circuit to the number of circuits. The number of circuits is changed using a number of agent processes, such as number of agent processes 226 in FIG. 2, for example.

Figure 16:
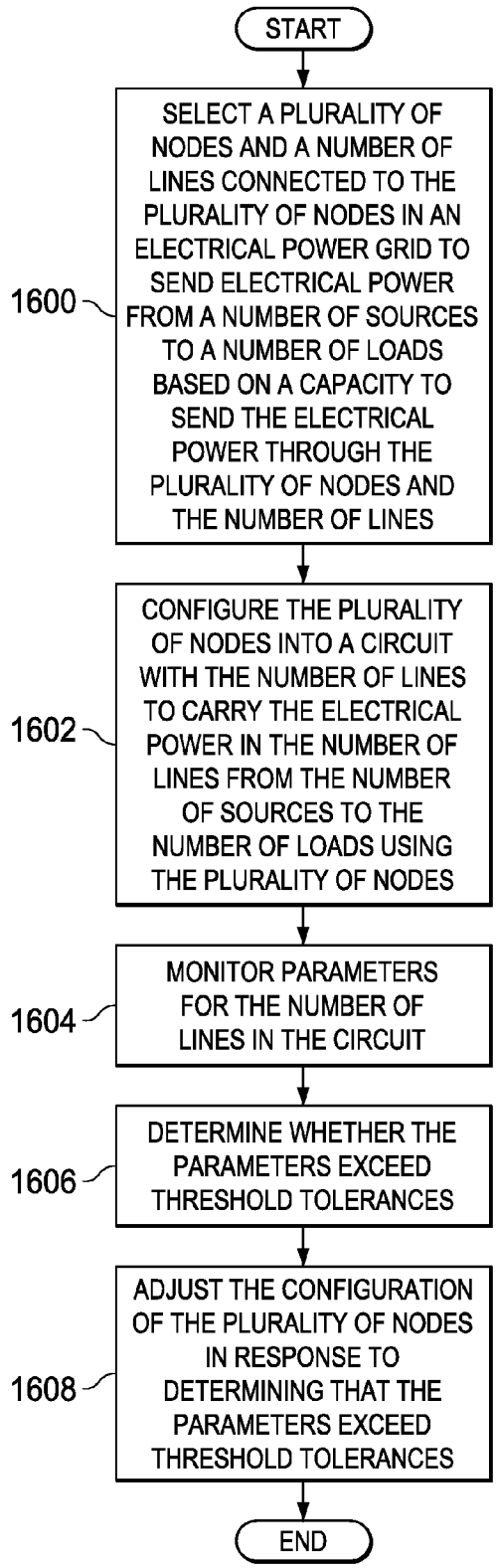
FIG. 16 is an illustration of a flowchart of a process for stabilizing power in an electrical power grid in accordance with an advantageous embodiment.

With reference now to FIG. 16, an illustration of a flowchart of a process for stabilizing power in an electrical power grid is depicted in accordance with an advantageous embodiment. The process illustrated in FIG. 16 may be implemented in an electrical power grid in an electrical power environment, such as electrical power grid 202 in electrical power environment 200 in FIG. 2. Further, this process is used to change the configuration of a plurality of nodes in a virtual power circuit in response to changes in capacity for the plurality of nodes.

The process begins by selecting a plurality of nodes and a number of lines connected to the plurality of nodes in an electrical power grid to send electrical power from a number of sources to a number of loads based on a capacity to send the electrical power through the plurality of nodes and the number of lines (operation 1600).

Thereafter, the process configures the plurality of nodes into a circuit with the number of lines to carry the electrical power in the number of lines from the number of sources to the number of loads using the plurality of nodes (operation 1602). This circuit is a virtual power circuit in this illustrative example.

The process then monitors parameters for the number of lines in the circuit (operation 1604). In operation 1604, monitoring includes receiving information for the parameters from sensors associated with the circuit in the electrical power grid. The parameters for the number of lines in the power grid may include at least one of a frequency of a current flowing in the number of lines, a phase of power carried in the number of lines, an amount of power consumed by the number of lines, and a voltage drop across the number of loads.

Thereafter, the process then determines whether the parameters exceed threshold tolerances (operation 1606). In operation 1606, the determination may be made by a number of agent processes, such as number of agent processes 226 in FIG. 2, for example.

The process then adjusts the configuration of the plurality of nodes in response to determining that the parameters exceed threshold tolerances (operation 1608), with the process terminating thereafter.

In operation 1608, the configuration of the plurality of nodes may be adjusted in a number of different ways. For example, adjusting the configuration of the plurality of nodes may involve replacing nodes in the plurality of nodes in the circuit with other nodes in the power grid. In another example, adjusting the configuration of the plurality of nodes may involve adjusting the configuration of a control device, such as control device 308 or control device 309 in FIG. 3.

Figure 17:
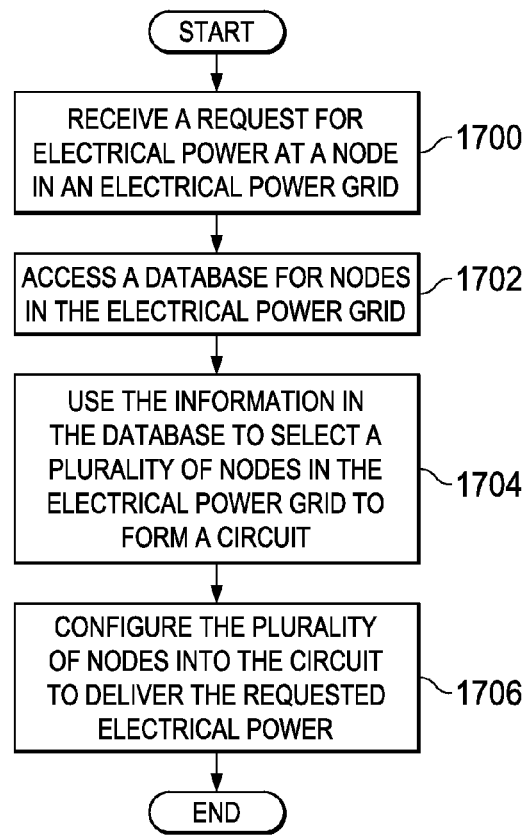
FIG. 17 is an illustration of a process for selecting a plurality of nodes for a circuit in accordance with an advantageous embodiment.

With reference now to FIG. 17, an illustration of a process for selecting a plurality of nodes for a circuit is depicted in accordance with an advantageous embodiment. The process illustrated in FIG. 17 may be implemented in electrical power environment 200 in FIG. 2, electrical power environment 500 in FIG. 5, and/or electrical power environment 600 in FIG. 6.

The process begins by receiving a request for electrical power at a node in an electrical power grid (operation 1700). In operation 1700, the request is received by an agent process, such as agent process 318 in FIG. 3, associated with the node. The process then accesses a database for nodes in the electrical power grid (operation 1702). In operation 1702, the database may be, for example, distributed database 341 in FIG. 3.

The database contains information, such as, for example, an identifier for each node in the electrical power grid, a location of each node in the electrical power grid, a capacity for electrical power in one or more lines connected at each node in the electrical power grid, security alerts, logs of events occurring at each node in the electrical power grid, and/or other suitable information. The database contains this information for at least one of a current state of each node and a previous state for each node.

The database is shared by all of the nodes in the electrical power grid. For example, the database may be stored in a processor unit in each node in the nodes in the electrical power grid. An agent process running on the processor unit may access the database. Further, agent processes running on the nodes in the electrical power grid may update the database based on an event. This event may be, for example, the elapsing of a period of time.

The process then uses the information in the database to select a plurality of nodes in the electrical power grid to form a circuit (operation 1704). In operation 1704, the agent process receiving the request in operation 1700 makes this selection based on the amount of power requested and the capacity of the node to carry the requested electrical power.

Thereafter, the process configures the plurality of nodes into the circuit to deliver the requested electrical power (operation 1706), with the process terminating thereafter. In operation 1706, the configuration of the plurality of nodes is performed by a number of agent processes associated with the plurality of nodes.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a number of circuits across a boundary in an electrical power grid, the method comprising:
    monitoring a number of parameters in the number of circuits in the electrical power grid, wherein each circuit in the number of circuits comprises a plurality of nodes in the electrical power grid and a number of lines connected to the plurality of nodes in the electrical power grid, wherein the number of lines is configured to carry electrical power, wherein the plurality of nodes is configured to control the electrical power carried in the number of lines, and wherein a number of agent processes associated with the plurality of nodes is configured to communicate with each other using a communications network, configure the plurality of nodes in the electrical power grid into the each circuit, and control a delivery of the electrical power through the each circuit to a number of loads;
    receiving information from a number of sensors associated with the plurality of nodes and the number of circuits in the electrical power grid, the number of sensors receiving information from the number of circuits such that the number of sensors and the number of lines cross an organizational boundary, the boundary preventing coordinated power management by the sensors between a first portion of the electrical power grid and a second portion of the electrical power grid separated by the boundary;
    communicating the information from a first agent process in a first portion of the electrical power grid to a second agent process in the second portion of the electrical power grid;
    determining whether to make a change to the number of circuits based on the number of parameters and a policy based on the information received from the number of sensors associated with the number of circuits in the electrical power grid; and
    responsive to a determination to make the change to the number of circuits across the boundary, changing the number of circuits using the policy.

2. The method of claim 1, wherein the step of changing the number of circuits using the policy comprises:
    changing a configuration of at least a portion of the plurality of nodes.

3. The method of claim 1, wherein the step of changing the number of circuits using the policy comprises:
    changing a composition of the plurality of nodes in at least one of the number of circuits.

4. The method of claim 1, wherein the step of changing the number of circuits using the policy comprises:
    adding a new circuit to the number of circuits.

5. The method of claim 1, wherein the number of parameters comprises at least one of a capacity in a line, and a reduction in capacity in the line.

6. The method of claim 1, wherein an agent process in the number of agent processes includes at least one of a control device interface process, a demand and response system interface process, an optimization process, a stabilization process, a power flow signaling process, an advertisement process, and a cyber security process.

7. The method of claim 6, wherein the optimization process in the agent process performs at least one of load balancing power flow within the electrical power grid, reducing power loss within the electrical power grid, reducing a cost of delivering power within the electrical power grid, reducing congestion in the electrical power grid, protecting control devices from operating outside of safety thresholds, and increasing the power flow relative to a capacity of the electrical power grid.

8. The method of claim 1, wherein the number of parameters comprises at least a temperature in the line.

9. The method of claim 1, wherein the number of parameters comprises at least a presence of a voltage having a value greater than a desired level.

10. The method of claim 1 further comprising:
an optimization process exchanging information with a power flow signaling process;
the power flow signaling process using optimization information to configure a node for optimization of a virtual power circuit, the optimization information including a configuration for a number of virtual power circuits in the electrical power grid that use a capacity of a number of power lines in the electrical power grid with a desired efficiency; and
the optimization process sending the optimization information to other agent processes in the virtual power circuit.

11. The method of claim 10 further comprising:
a stabilization process receiving stability information from the plurality of nodes, stability information including values for a number of parameters for a number of devices in the plurality of nodes that indicate the presence of fluctuations in the distribution of power through the node;
the stabilization process sending the stability information to an advertisement process;
the advertisement process storing the stability information; and
the advertisement process sending the stability information to a number of agent processes.

12. An apparatus comprising:
a number of circuits in an electrical power grid, wherein each circuit in the number of circuits comprises a plurality of nodes in the electrical power grid and a number of lines connected to the plurality of nodes in the electrical power grid wherein the number of lines is configured to carry electrical power; wherein the plurality of nodes is configured to control the electrical power carried in the number of lines;
a number of sensors associated with the plurality of nodes and the number of circuits in the electrical power grid, the number of sensors configured to monitor a number of parameters in the number of circuits in the electrical power grid and the at least a portion of the agent processes configured to receive information from the number of sensors, the number of sensors is attached to the number of lines such that the number of sensors and the number of lines cross a boundary, the boundary preventing coordinated power management by the number of sensors between a first portion of the electrical power grid and a second portion of the electrical power grid separated by the boundary; and
a number of agent processes associated with the number of circuits, a first agent process in a first portion of the electrical power grid communicating the information with a second agent process in the second portion of the electrical power grid, wherein at least a portion of the agent processes is configured to monitor a number of parameters in the number of circuits in the electrical power grid, determine whether to make a change to the number of circuits based on the number of parameters and a policy, and change the number of circuits across the boundary using the policy in response to the determination to make the change to the number of circuits.

13. The apparatus of claim 12, wherein in changing the number of circuits using the policy, the agent processes are configured to change a configuration of at least a portion of the plurality of nodes.

14. The apparatus of claim 12, wherein in changing the number of circuits using the policy, the at least a portion of the agent processes is configured to change a composition of the plurality of nodes in at least one of the number of circuits.

15. The apparatus of claim 12, wherein in changing the number of circuits using the policy, the at least a portion of the agent processes is configured to add a new circuit to the number of circuits.

16. The apparatus of claim 12, wherein in determining whether to make the change to the number of circuits based on the number of parameters and the policy, the at least a portion of the agent processes is configured to determine whether to make the change to the number of circuits based on the information received from the number of sensors associated with the number of circuits in the electrical power grid.

17. The apparatus of claim 12, wherein the number of parameters comprises at least one of a capacity in a line, a temperature in the line, a presence of a voltage having a value greater than a desired level, and a reduction in capacity in the line.

18. The apparatus of claim 12, wherein an agent process in the agent processes includes at least one of a control device interface process, a demand and response system interface process, an optimization process, a stabilization process, a power flow signaling process, an advertisement process, and a cyber security process.

19. The apparatus of claim 18, wherein the optimization process in the agent process performs at least one of load balancing power flow within the electrical power grid, reducing power loss within the electrical power grid, reducing a cost of delivering power within the electrical power grid, reducing congestion in the electrical power grid, protecting control devices from operating outside of safety thresholds, and increasing the power flow relative to a capacity of the electrical power grid.

20. The apparatus of claim 12, wherein the number of agent processes associated with the plurality of nodes is configured to communicate with each other using a communications network across the boundary, configure the plurality of nodes in the electrical power grid into the each circuit across the boundary, and control a delivery of the electrical power through the each circuit to a number of loads across the boundary.

21. A method for controlling power in an electrical power grid across a boundary, the method comprising:
selecting a plurality of nodes and a number of lines connected to the plurality of nodes in the electrical power grid to send electrical power from a number of sources to a number of loads based on a capacity to send the electrical power through the plurality of nodes and the number of lines;
configuring the plurality of nodes and the number of lines into a circuit to carry the electrical power from the number of sources to the number of loads using the plurality of nodes;
monitoring parameters for the number of lines in the circuit;
receiving information from a number of sensors associated with the circuit in the electrical power grid, the number of sensors associated with the number of lines and the plurality of nodes, the number of sensors and the plurality of nodes positioned so as to manage power distribution across a boundary, the boundary preventing coordinated power management by the sensors between a first portion of the electrical power grid and a second portion of the electrical power grid separated by the boundary;

communicating the information from a first agent process in a first portion of the electrical power grid to a second agent process in the second portion of the electrical power grid;

determining whether the parameters exceed threshold tolerances; and responsive to a determination that the parameters exceed threshold tolerances, adjusting a configuration of the plurality of nodes.

22. The method of claim 21, wherein the step of responsive to the determination that the parameters exceed the threshold tolerances, adjusting the configuration of the plurality of nodes further comprises:

changing nodes in the plurality of nodes in the circuit with other nodes in the electrical power grid.

23. The method of claim 21, wherein the step of responsive to the determination that the parameters exceed the threshold tolerances, adjusting the configuration of the plurality of nodes further comprises:

adjusting a phase of impedance associated with nodes in the plurality of nodes in the circuit.

24. The method of claim 21, wherein the parameters for the number of lines comprise at least one of a capacity, a bus voltage, volts amps reactive, a power flow in the number of lines, a phase of power sent in through the number of lines, an amount of power consumed by the number of lines, and a voltage drop across the number of loads.

25. An apparatus comprising:

an electrical power grid comprising nodes and lines;

agent processes associated with the nodes in the electrical power grid, the number of agent processes configured to exchange information across a boundary, wherein at least a portion of the agent processes are configured to select a plurality of nodes in the nodes and a number of lines in the lines connected to the plurality of nodes in the electrical power grid to send electrical power from a number of sources to a number of loads based on a capacity to send the electrical power through the plurality of nodes and the number of lines; configure the plurality of nodes and the number of lines into a circuit to carry the electrical power from the number of sources to the number of loads using the plurality of nodes; monitor parameters for the number of lines in the circuit; determine whether the parameters exceed threshold tolerances; and adjust a configuration of the plurality of nodes in response to a determination that the parameters exceed the threshold tolerances; and a number of sensors associated with the nodes and lines in the electrical power grid, wherein in monitoring the parameters for the number of lines in the circuit, the at least a portion of the agent processes are configured to receive information from the number of sensors, the number of sensors is attached to the number of lines such that the number of sensor and the number of lines cross an organizational boundary, the boundary preventing coordinated power management by the sensors between a first portion of the electrical power grid and a second portion of the electrical power grid separated by the boundary, wherein a first agent process in a first portion of the electrical power grid communicates information from the sensors with a second agent process in the second portion of the electrical power grid so as to adjust the configuration.

26. The apparatus of claim 25, wherein in adjusting the configuration of the plurality of nodes in response to the determination that the parameters exceed the threshold tolerances, the at least a portion of the agent processes are configured to change a portion of nodes in the plurality of nodes in the circuit with other nodes in the electrical power grid.

27. The apparatus of claim 25, wherein in adjusting the configuration of the plurality of nodes in response to the determination that the parameters exceed the threshold tolerances, the at least a portion of the agent processes are configured to adjust a phase of impedance associated with nodes in the plurality of nodes in the circuit.

28. The apparatus of claim 25, wherein the parameters for the number of lines comprise at least one of a capacity, a bus voltage, volts amps reactive, a power flow in the number of lines, a phase of power sent in through the number of lines, an amount of power consumed by the number of lines, and a voltage drop across the number of loads.

* * * * *